(12) United States Patent
Dutta et al.

(10) Patent No.: US 12,463,765 B2
(45) Date of Patent: Nov. 4, 2025

(54) TECHNIQUES FOR SIDELINK SYNCHRONIZATION SIGNAL TRANSMISSION WITH MULTI-TRANSMISSION AND RECEIVE POINT (TRP) USER EQUIPMENT (UES)

(71) Applicant: QUALCOMM INCORPORATED, San Diego, CA (US)

(72) Inventors: Sourjya Dutta, San Diego, CA (US); Kapil Gulati, Belle Mead, NJ (US); Junyi Li, Fairless Hills, PA (US); Shuanshuan Wu, San Diego, CA (US); Hui Guo, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 338 days.

(21) Appl. No.: 18/004,283

(22) PCT Filed: Sep. 4, 2020

(86) PCT No.: PCT/CN2020/113409
§ 371 (c)(1),
(2) Date: Jan. 4, 2023

(87) PCT Pub. No.: WO2022/047718
PCT Pub. Date: Mar. 10, 2022

(65) Prior Publication Data
US 2023/0246766 A1 Aug. 3, 2023

(51) Int. Cl.
- *H04L 5/00* (2006.01)
- *H04W 56/00* (2009.01)
- *H04W 88/04* (2009.01)

(52) U.S. Cl.
CPC .......... *H04L 5/0048* (2013.01); *H04L 5/0035* (2013.01); *H04W 56/001* (2013.01); *H04W 88/04* (2013.01)

(58) Field of Classification Search
CPC ... H04L 5/0048; H04L 5/0035; H04L 5/0023; H04L 5/0032; H04L 5/0091; H04L 5/001;
(Continued)

(56) References Cited

U.S. PATENT DOCUMENTS

| 10,009,925 B2 | 6/2018 | Vajapeyam et al. |
| 10,893,557 B2 | 1/2021 | Gulati et al. |

(Continued)

FOREIGN PATENT DOCUMENTS

| CN | 110771257 A | 2/2020 |
| WO | 2016054584 A2 | 4/2016 |

(Continued)

OTHER PUBLICATIONS

Supplementary European Search Report—EP20951965—Search Authority—The Hague—May 7, 2024.
(Continued)

*Primary Examiner* — Ian N Moore
*Assistant Examiner* — Latresa A McCallum
(74) *Attorney, Agent, or Firm* — Holland & Hart, LLP

(57) ABSTRACT

Methods, systems, and devices for wireless communications are described. A first user equipment (UE) may receive, from a second UE, a first sidelink synchronization signal (SLSS) at a first transmission-reception point (TRP) and a second TRP different from the first TRP. The first UE may perform a first set of measurements on the first SLSS received at the first TRP and a second set of measurements on the first SLSS received at the second TRP. The first UE may then transmit, to a third UE, a second SLSS based at least in part on the first set of measurements, the second set of measurements, or both, satisfying one or more measurement thresholds.

34 Claims, 11 Drawing Sheets

(58) Field of Classification Search
CPC ...... H04L 5/14; H04W 56/001; H04W 88/04; H04W 56/0015; H04W 56/002; H04W 92/18

See application file for complete search history.

(56) References Cited

U.S. PATENT DOCUMENTS

| | | |
|---|---|---|
| 2017/0208636 A1 | 7/2017 | Agiwal et al. |
| 2017/0289934 A1 | 10/2017 | Sheng et al. |
| 2017/0289940 A1 | 10/2017 | Yang et al. |
| 2018/0279296 A1* | 9/2018 | Hosseini ............... H04L 5/0053 |
| 2018/0287866 A1 | 10/2018 | Yoon |
| 2019/0312693 A1* | 10/2019 | Belleschi ............ H04W 56/002 |
| 2020/0260440 A1 | 8/2020 | Yasukawa et al. |
| 2023/0239937 A1* | 7/2023 | Müller .................. H04B 7/022 370/329 |
| 2025/0159631 A1* | 5/2025 | Zhang ................. H04W 74/006 |

FOREIGN PATENT DOCUMENTS

| | | |
|---|---|---|
| WO | 2016185285 A1 | 11/2016 |
| WO | 2018172485 A1 | 9/2018 |
| WO | WO-2018204130 | 11/2018 |
| WO | WO-2019157997 A1 | 8/2019 |
| WO | WO-2020033086 A1 | 2/2020 |
| WO | WO-2020126115 A1 | 6/2020 |

OTHER PUBLICATIONS

International Search Report and Written Opinion—PCT/CN2020/113409—ISA/EPO—May 27, 2021.

LG Electronics: Enhancements on Multi-TRP/Panel Transmission, 3GPP Draft, R1-1910582, 3GPP TSG RAN WG1 Meeting #98bis, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808599, 23 Pages, p. 17, the Whole Document.

* cited by examiner

TECHNIQUES FOR SIDELINK SYNCHRONIZATION SIGNAL TRANSMISSION WITH MULTI-TRANSMISSION AND RECEIVE POINT (TRP) USER EQUIPMENT (UES)

CROSS REFERENCE

The present application is a 371 national stage filing of International PCT Application No. PCT/CN2020/113409 by DUTTA et al. entitled "TECHNIQUES FOR SIDELINK SYNCHRONIZATION SIGNAL TRANSMISSION WITH MULTI-TRANSMISSION AND RECEIVE POINT (TRP) USER EQUIPMENT (UES)," filed Sep. 4, 2020, which is assigned to the assignee hereof, and which is expressly incorporated by reference in its entirety herein.

FIELD OF TECHNOLOGY

The following relates to wireless communications, including techniques for sidelink synchronization signal (SLSS) transmission with multi-transmission-reception point (TRP) user equipments (UEs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless devices, such as user equipments (UEs) may exchange sidelink synchronization signals (SLSSs) between one another such that the respective UEs may coordinate and synchronize their internal timers with the network and other UEs within the network. Additionally, each UE may determine whether or not the respective UE should relay (e.g., transmit) the SLSSs to additional UEs within the system based on determined characteristics (e.g., power, quality) associated with the received SLSS.

SUMMARY

The described techniques relate to improved methods, systems, devices, and apparatuses that support techniques for sidelink synchronization signal (SLSS) transmission with multi-transmission-reception point (TRP) user equipments (UEs). In some aspects, a first UE (e.g., multi-TRP UE) may perform measurements on SLSSs received at a first TRP and a second TRP. The first UE may then determine whether to transmit (e.g., relay) the SLSSs based on whether or not the measurements performed on the SLSSs received at the first TRP and the second TRP satisfy one or more thresholds. For example, the first UE may compare both the first set of measurements performed at the first TRP and the second set of measurements performed at the second TRP to a single measurement threshold, and may relay the SLSSs if at least one set of measurements satisfies (e.g., is less than) the measurement threshold (e.g., relay if $RSRP < Thresh_{RSRP}$). Specifically, the first UE may relay the SLSSs via both TRPs, or only the TRP associated with the measurements that satisfy the measurement threshold.

In other cases, the first UE may compare the sets of measurements performed at the respective TRPs to multiple thresholds. For example, if measurements fall below a first measurement threshold (e.g., lower-bound measurement threshold), the first UE may initiate a timer. In this example, if the measurements rise above a second measurement threshold (e.g., upper-bound measurement threshold) before the timer expires, the first UE may deactivate the timer and refrain from relaying SLSSs. Conversely, if the timer expires before the second measurement threshold is satisfied, the first UE may determine to relay SLSSs. The multiple thresholds may be applied to both TRPs in combination, to each TRP individually, or both. In some cases, the measurements performed at the various TPRs may be used to determine a beam direction of the received SLSSs such that relayed SLSSs may be transmitted along the same (or similar) beam direction. By enabling for efficient reception and transmission of SLSSs in the context of multi-TRP UEs, the efficiency and effectiveness of wireless communications within the network may be improved.

A method for wireless communication at a first UE is described. The method may include receiving, from a second UE, a first SLSS at a first transmission-reception point (TRP) and a second TRP different from the first TRP, performing a first set of measurements on the first SLSS received at the first TRP and a second set of measurements on the first SLSS received at the second TRP, and transmitting, to a third UE, a second SLSS based on the first set of measurements, the second set of measurements, or both, satisfying one or more measurement thresholds.

An apparatus for wireless communication at a first UE is described. The apparatus may include a processor, memory in electronic communication with the processor, and instructions stored in the memory. The instructions may be executable by the processor to cause the apparatus to receive, from a second UE, a first SLSS at a first TRP and a second TRP different from the first TRP, perform a first set of measurements on the first SLSS received at the first TRP and a second set of measurements on the first SLSS received at the second TRP, and transmit, to a third UE, a second SLSS based on the first set of measurements, the second set of measurements, or both, satisfying one or more measurement thresholds.

Another apparatus for wireless communication at a first UE is described. The apparatus may include means for receiving, from a second UE, a first SLSS at a first TRP and a second TRP different from the first TRP, means for performing a first set of measurements on the first SLSS received at the first TRP and a second set of measurements on the first SLSS received at the second TRP, and means for transmitting, to a third UE, a second SLSS based on the first set of measurements, the second set of measurements, or both, satisfying one or more measurement thresholds.

A non-transitory computer-readable medium storing code for wireless communication at a first UE is described. The code may include instructions executable by a processor to receive, from a second UE, a first SLSS at a first TRP and a second TRP different from the first TRP, perform a first set of measurements on the first SLSS received at the first TRP and a second set of measurements on the first SLSS received at the second TRP, and transmit, to a third UE, a second SLSS based on the first set of measurements, the second set of measurements, or both, satisfying one or more measurement thresholds.

Some examples of the method, apparatuses, and non-transitory computer-readable medium described herein may further include operations, features, means, or instructions for determining that the first set of measurements fail to satisfy the one or more measurement thresholds, determining that the second set of measurements satisfy the one or more measurement thresholds, and transmitting the second SLSS using the second TRP based on determining that the first set of measurements fail to satisfy the one or more measurement thresholds, determining that the second set of measurements satisfy the one or more measurement thresholds, or both.

Some examples of the method, apparatuses, and non-transitory computer-readable medium described herein may further include operations, features, means, or instructions for refraining from transmitting the second SLSS using the first TRP based on determining that the first set of measurements fail to satisfy the one or more measurement thresholds.

Some examples of the method, apparatuses, and non-transitory computer-readable medium described herein may further include operations, features, means, or instructions for transmitting the second SLSS using the first TRP based on determining that the first set of measurements fail to satisfy the one or more measurement thresholds, determining that the second set of measurements satisfy the one or more measurement thresholds, or both.

In some examples of the method, apparatuses, and non-transitory computer-readable medium described herein, the first set of measurements, the second set of measurements, or both, include a received signal strength indicator (RSSI) measurement, a reference signal received power (RSRP) measurement, a reference signal received quality (RSRQ) measurement, or any combination thereof.

In some examples of the method, apparatuses, and non-transitory computer-readable medium described herein, the one or more measurement thresholds include an RSSI threshold, an RSRP threshold, an RSRQ threshold, or any combination thereof, and the first set of measurements, the second set of measurements, or both, satisfy a respective measurement threshold if the first set of measurements, the second set of measurements, or both, may be less than or equal to the respective measurement threshold.

Some examples of the method, apparatuses, and non-transitory computer-readable medium described herein may further include operations, features, means, or instructions for determining that the first set of measurements, the second set of measurements, or both, satisfy a first measurement threshold of the one or more measurement thresholds, initiating one or more timers based on determining that the first set of measurements, the second set of measurements, or both, satisfy the first measurement threshold, and determining an expiration of the one or more timers based on initiating the one or more timers, where transmitting the second SLSS may be based on determining the expiration of the one or more timers.

In some examples of the method, apparatuses, and non-transitory computer-readable medium described herein, initiating the one or more timers based on determining that the first set of measurements, the second set of measurements, or both, satisfy the first measurement threshold, may include operations, features, means, or instructions for initiating a first timer associated with the first TRP based on determining the first set of measurements satisfy the first measurement threshold and initiating a second timer associated with the second TRP based on determining the second set of measurements satisfy the first measurement threshold.

In some examples of the method, apparatuses, and non-transitory computer-readable medium described herein, transmitting the second SLSS may include operations, features, means, or instructions for transmitting the second SLSS using the first TRP based on determining an expiration of the first timer associated with the first TRP and transmitting the second SLSS using the second TRP based on determining an expiration of the second timer associated with the second TRP.

Some examples of the method, apparatuses, and non-transitory computer-readable medium described herein may further include operations, features, means, or instructions for determining that the first set of measurements, the second set of measurements, or both, satisfy a first measurement threshold of the one or more measurement thresholds, initiating one or more timers based on determining that the first set of measurements, the second set of measurements, or both, satisfy the first measurement threshold, deactivating the one or more timers based on determining that the first set of measurements, the second set of measurements, or both, satisfy a second measurement threshold of the one or more measurement thresholds, the second measurement threshold different from the first measurement threshold, and refraining from transmitting the second SLSS based on deactivating the one or more timers.

Some examples of the method, apparatuses, and non-transitory computer-readable medium described herein may further include operations, features, means, or instructions for determining a set of resources associated with the first SLSS, the second SLSS, or both, where transmitting the second SLSS may be based on determining the set of resources.

Some examples of the method, apparatuses, and non-transitory computer-readable medium described herein may further include operations, features, means, or instructions for receiving the first SLSS using a first subset of the set of resources based on determining the set of resources and transmitting the second SLSS using a second subset of the set of resources different from the first subset based on determining the set of resources.

Some examples of the method, apparatuses, and non-transitory computer-readable medium described herein may further include operations, features, means, or instructions for receiving, from a base station, a control message including an indication of the set of resources, where determining the set of resources may be based on receiving the control message.

In some examples of the method, apparatuses, and non-transitory computer-readable medium described herein, transmitting the second SLSS may include operations, features, means, or instructions for transmitting the second SLSS according to the set of resources using a selected TRP from the first TRP and the second TRP and transmitting nulls according to the set of resources using the first TRP or the second TRP which may be different from the selected TRP.

Some examples of the method, apparatuses, and non-transitory computer-readable medium described herein may further include operations, features, means, or instructions for estimating a beam direction of the first SLSS based on the first set of measurements and the second set of measurements, where the second SLSS may be transmitted based on the estimated beam direction.

Some examples of the method, apparatuses, and non-transitory computer-readable medium described herein may further include operations, features, means, or instructions for transmitting the second SLSS along a second beam direction which may be equivalent to the estimated beam direction.

DETAILED DESCRIPTION

Figure 1:
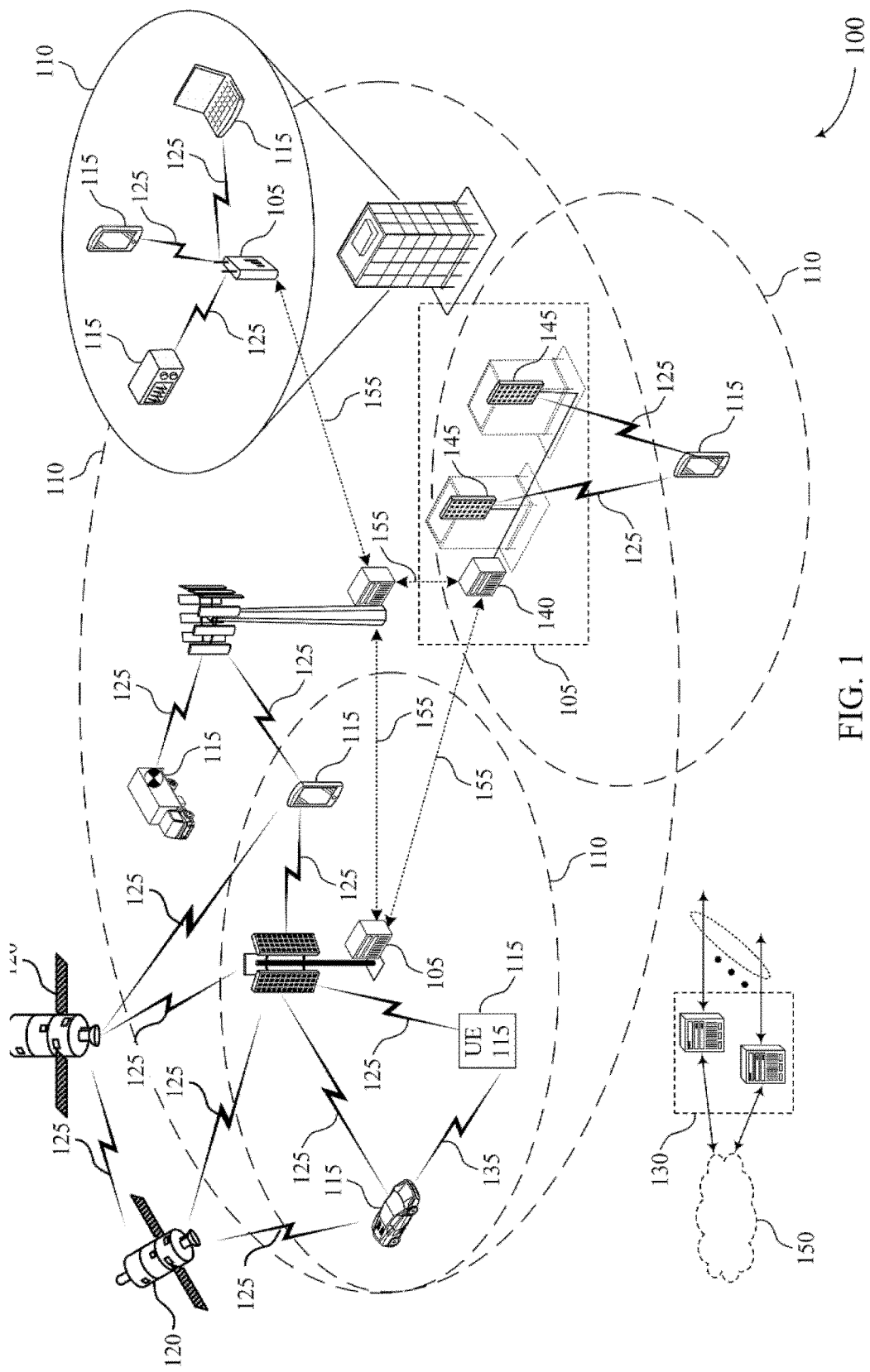
FIG. 1 illustrates an example of a wireless communications system that supports techniques for sidelink synchronization signal (SLSS) transmission with multi-transmission-reception point (TRP) user equipments (UEs) in accordance with aspects of the present disclosure.

In some wireless communications systems, wireless devices, such as user equipments (UEs) may exchange sidelink synchronization signals (SLSSs) between one another such that the respective UEs may coordinate and synchronize their internal timers with the network and other UEs within the network. For example, a first UE which is unable to receive timing information directly from the network (e.g., base station, satellite) may receive SLSSs from a second UE (e.g., a synchronization reference (SyncRef)) UE. The first UE may then utilize the received SLSSs to coordinate and synchronize its internal timers. Additionally, the first UE may determine whether or not the first UE should "relay" the received SLSSs to additional UEs within the network (e.g., determine whether it should become a SyncRef UE). The first UE may determine whether or not it should relay the SLSSs to additional UEs based on a strength (e.g., received signal strength indicator (RSSI), reference signal received power (RSRP), reference signal received quality (RSRQ)) of the received SLSSs. For instance, if the strength (e.g., RSRP) of the received SLSSs is above a given threshold (e.g., RSRP>$Thresh_{RSRP}$), the first UE may determine that the SLSSs are strong enough to reach additional UEs within the system, and may thereby refrain from relaying SLSSs. Conversely, if the strength of the received SLSSs is below a given threshold (e.g., RSRP<$Thresh_{RSRP}$), the first UE may determine that the SLSSs may not be strong enough to reach additional UEs within the system, and may thereby determine to relay the SLSSs to additional UEs.

However, in the context of UEs with multiple transmission-reception points (TRPs), measured strengths of the received SLSSs may vary dramatically between the TRPs. For instance, a 16-wheel semi-truck may include two separate TRPs which are separated by around 20 meters, which may result in significant differences in measured SLSS strengths. These varying SLSS strengths in the context of multi-TRP UEs may significantly complicate the determination as to whether or not the UEs should relay SLSSs. Additionally, conventional techniques do not enable multi-TRPs to determine whether SLSSs should be relayed by all or just a subset of the TRPs.

To improve wireless communications in the context of SLSS transmission and reception, techniques for SLSS transmission and reception with multi-TRP UEs are disclosed. In some aspects, a first UE (e.g., multi-TRP UE) may perform measurements (e.g., RSSI measurements, RSRP measurements, RSRQ measurements) on SLSSs received at a first TRP and a second TRP. The first UE may then determine whether to transmit (e.g., relay) the SLSSs based on whether or not the measurements performed on the SLSSs received at the first TRP and the second TRP satisfy one or more thresholds (e.g., RSSI threshold, RSRP threshold, RSRQ threshold). For example, the first UE may compare both the first set of measurements performed at the first TRP and a second set of measurements performed at the second TRP to a single measurement threshold, and may relay the SLSSs if at least one set of measurements satisfies (e.g., is less than) the measurement threshold (e.g., relay if RSRP<$Thresh_{RSRP}$). Specifically, the first UE may relay the SLSSs via both TRPs, or only the TRP associated with the measurements that satisfy the measurement threshold.

In other cases, the first UE may compare the sets of measurements performed at the respective TRPs to multiple thresholds. For example, if measurements fall below a first measurement threshold (e.g., lower-bound measurement threshold), the first UE may initiate a timer. In this example, if the measurements rise above a second measurement threshold (e.g., upper-bound measurement threshold) before the timer expires, the first UE may deactivate the timer and refrain from relaying SLSSs. Conversely, if the timer expires before the second measurement threshold is satisfied, the first UE may determine to relay SLSSs. The multiple thresholds may be applied to both TRPs in combination, to each TRP individually, or both. In some cases, the measurements performed at the various TPRs may be used to determine a beam direction of the received SLSSs such that relayed SLSSs may be transmitted along the same (or similar) beam direction. By enabling for efficient reception and transmission of SLSSs in the context of multi-TRP UEs, the efficiency and effectiveness of wireless communications within the network may be improved.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for SLSS transmission with multi-TRP UEs FIG. 1 illustrates an example of a wireless communications system 100 that supports techniques for SLSS transmission with multi-TRP UEs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communications links 125. Each base station 105 may provide a coverage area 110 over which the UEs 115 and the base station 105 may establish one or more communications links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 155 (e.g., via an S1, N2, N3, or other interface). The base stations 105 may communicate with one another over the backhaul links 155 (e.g., via an X2, Xn, or other interface) either directly (e.g., directly between base stations 105), or indirectly (e.g., via core network 130), or both. In some examples, the backhaul links 155 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communications links 125 over one or more carriers. The term "carrier" may refer to a set of radio frequency spectrum resources having a defined physical layer structure for supporting the communications links 125. For example, a carrier used for a communications link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communications links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communications link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the radio resource control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communications link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 120. A satellite 120 may communicate with base stations 105, which may be referred to as gateways in a non-terrestrial network, and UEs 115, which may include other high altitude or terrestrial communications devices. In some examples, a satellite 120 itself may be an example of a base station 105. A satellite 120 may be any suitable type of communication satellite configured to relay or otherwise support communications between different devices in the wireless communications system 100. A satellite 120 may be an example of a space satellite, a balloon, a dirigible, an airplane, a drone, an unmanned aerial vehicle, or other vehicle which may support communications from a generally non-terrestrial, overhead, or elevated position. In some examples, a satellite 120 may be in a geosynchronous or geostationary earth orbit, a low earth orbit, or a medium earth orbit. A satellite 120 may be a multi-beam satellite configured to provide service for multiple service beam coverage areas in a configured geographical service area. The satellite 120 may be any distance away from the surface of the earth or other reference surface.

In some examples, a cell may be provided or established by a satellite 120 as part of a non-terrestrial network. A satellite 120 may, in some cases, perform the functions of a base station 105, act as a bent-pipe satellite, or act as a regenerative satellite, or a combination thereof. In some examples, a satellite 120 may be an example of a smart satellite, or a satellite with intelligence or other communications processing capability. For example, a smart satellite may be configured to perform more functions than a regenerative satellite (e.g., may be configured to perform particular algorithms beyond those used in regenerative satellites, to be reprogrammed). In a bent-pipe transponder configuration, a satellite 120 may be configured to receive signals from ground stations (e.g., gateways, base stations 105, a core network 130) and transmit those signals to different ground stations or terminals (e.g., UEs 115, base stations 105). In some cases, a satellite 120 supporting a bent-pipe transponder configuration may amplify signals or shift from uplink frequencies to downlink frequencies. In some examples, a satellite 120 supporting a regenerative transponder configuration may relay signals like a bent-pipe transponder configuration, but may also use on-board processing to perform other functions. Examples of these other functions may include demodulating a received signal, decoding a received signal, re-encoding a signal to be transmitted, or modulating the signal to be transmitted, or a combination thereof. In some examples, a satellite 120 supporting a bent pipe transponder configuration or regenerative transponder configuration may receive a signal from a base station 105 and may relay the signal to a UE 115 or base station 105, or vice-versa.

The UEs 115 of the wireless communications system 100 may support techniques for SLSS transmission and reception. In particular, the UEs 115 of the wireless communications system may facilitate the transmission and reception of SLSSs in the context of multi-TRP UEs 115. Specifically, the techniques described herein may enable multi-TRP UEs 115 of the wireless communications system 100 to efficiently and effectively determine whether the respective multi-TRP UEs 115 should relay received SLSSs to other UEs 115 within the wireless communications system 100. Additionally, in the event a multi-TRP UE 115 determines that it may relay SLSSs, the techniques described herein may enable the multi-TRP UE 115 to determine which TRP(s) the multi-TRP UE 115 should use to transmit (e.g., relay) the SLSSs.

For example, a first UE 115 (e.g., multi-TRP UE 115) of the wireless communications system 100 may receive SLSSs from a second UE 115 (e.g., SyncRef UE 115) of the wireless communications system 100. The first UE 115 may perform measurements (e.g., RSSI measurements, RSRP measurements, RSRQ measurements) on the SLSSs received at a first TRP and a second TRP of the first UE 115. The first UE 115 may then determine whether to transmit (e.g., relay) the SLSSs based on whether or not the measurements performed on the SLSSs received at the first TRP and the second TRP satisfy one or more thresholds (e.g., RSSI threshold, RSRP threshold, RSRQ threshold). For example, the first UE 115 may compare both the first set of measurements performed at the first TRP and a second set of measurements performed at the second TRP to a single measurement threshold, and may relay the SLSSs if at least one set of measurements satisfies (e.g., is less than) the measurement threshold (e.g., relay if RSRP<$\text{Thresh}_{RSRP}$). Specifically, the first UE 115 may relay the SLSSs via both TRPs, or only the TRP associated with the measurements that satisfy the measurement threshold.

In additional or alternative cases, the first UE 115 may compare the sets of measurements performed at the respective TRPs to multiple thresholds. For example, if measurements from one or both of the TRPs fall below a first measurement threshold (e.g., lower-bound measurement threshold), the first UE 115 may initiate a timer. In this example, if the measurements rise above a second measurement threshold (e.g., upper-bound measurement threshold) before the timer expires, the first UE 115 may deactivate the timer and refrain from relaying SLSSs. Conversely, if the timer expires before the second measurement threshold is satisfied, the first UE 115 may determine to relay SLSSs to other UEs 115 within the wireless communications system 100. The multiple thresholds and the respective timers may be applied to both TRPs in combination, to each TRP individually, or both.

In some aspects, the measurements performed at the various TPRs of the multi-TRP UE 115 may be used to determine a beam direction of the received SLSSs such that relayed SLSSs may be transmitted along the same (or similar) beam direction. Such techniques may improve the probability that the relayed SLSSs will effectively reach other UEs 115 within the wireless communications system 100

Techniques described herein may enable multi-TRP UEs 115 to effectively determine whether the multi-TRP UEs 115 should relay SLSSs to other UEs 115 within the wireless communications system 100. In particular, by comparing measurements performed at the multiple TRPs to one or more measurement thresholds, multi-TRP UEs 115 may be able to efficiently determine whether the respective multi-TRP UEs 115 should become SyncRef UEs 115 to improve distribution of SLSSs throughout the system. Accordingly, by improving the efficiency and reliability of SLSS distribution within the wireless communications system 100, techniques described herein may improve clock synchronization among UEs 115 within the wireless communications system 100, thereby leading to improved wireless communications and improved user experience.

Figure 2:
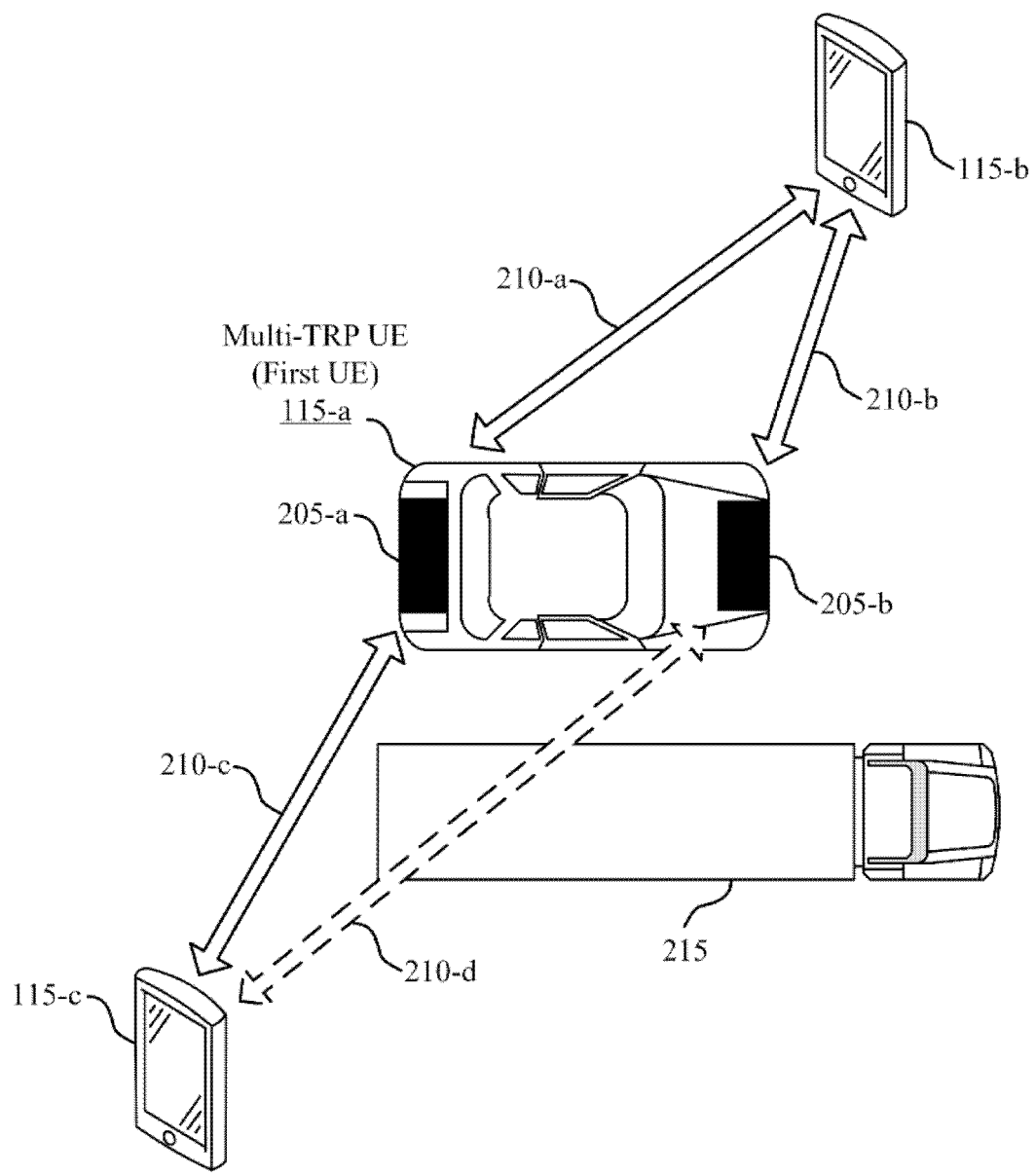
FIG. 2 illustrates an example of a wireless communications system that supports techniques for SLSS transmission with multi-TRP UEs in accordance with aspects of the present disclosure.

FIG. 2 illustrates an example of a wireless communications system 200 that supports techniques for SLSS transmission with multi-TRP UEs in accordance with aspects of the present disclosure. In some examples, wireless communications system 200 may implement aspects of wireless communications system 100. The wireless communications system 200 may include a first UE 115-$a$, a second UE 115-$b$, and a third UE 115-$c$, which may be examples of UEs 115 described with reference to FIG. 1.

In some aspects, the first UE 115-$a$ illustrated in FIG. 2 may include a multi-TRP UE 115-$a$. For example, the first UE 115-$a$ may include a first TRP 205-$a$ and a second TRP 205-$b$. In some aspects, each of the TRPs 205-$a$ and 205-$b$ may be configured to receive and transmit signals. The TRPs 205-$a$ and 205-$b$ may be configured to transmit signals in conjunction with one another, individually (e.g., separately from one another), or both. In this regard, the TRPs 205 may include, but are not limited to, antennas, antenna panels, and the like.

In some cases, the TRPs 205 of the first UE 115-$a$ may be positioned proximate (e.g., close) to one another. In other cases, the TRPs 205 of the first UE 115-$a$ may be physically separated from each other by some distance. For example, in the context of a vehicle, the first TRP 205-$a$ may be positioned near the front of the vehicle, and the second TRP 205-$b$ may be positioned at near the rear of the vehicle. In this example, the first TRP 205-$a$ (e.g., first antenna panel) and the second TRP 205-$b$ (e.g., second antenna panel) may be separated from one another by several meters. This physical separation may be even larger in the case of larger UEs 115, such as semi-trucks, where multiple TRPs 205 may be physically separated from one another by twenty meters or more.

Due to the separate components, physical position, and physical separation between the first TRP 205-$a$ and the second TRP 205-$b$, each of the respective TRPs 205 may view the channel differently. For example, the first TRP 205-$a$ may receive signals from the second UE 115-$b$ via a communications link 210-$a$, and the second TRP 205-$b$ may receive signals from the second UE 115-$b$ via communications link 210-$b$. In this example, the signals received at the first TRP 205-$a$ may travel a greater distance than the signals received at the second TRP 205-$b$. The varying propagation distances may result in varying parameters (e.g., characteristics) associated with the signals received by the respective TRPs 205. For instance, due to the differences in propagation distances, the signals received at the first TRP 205-$a$ may exhibit a lower signal quality (e.g., lower RSRP, lower RSRQ, higher SNR, higher SINR) as compared to the signals received at the second TRP 205-$b$. Moreover, the signals received at the first TRP 205-$a$ may be received later in time than the signals received at the second TRP 205-$b$.

These differences in signal parameters (e.g., RSRP, RSRQ, SNR, SINR, time of receipt) may result despite the fact that the respective signals were transmitted by the second UE 115-$b$ at the same time and with the same transmit power.

Physical obstructions, weather conditions, noise, line of sight (LoS) vs. non-line of sight (NLoS), and other conditions may further increase differences between signals transmitted and/or received by the respective TRPs 205. For example, the third UE 115-$c$ may transmit signals to the first TRP 205-$a$ via a communications link 210-$c$, and may transmit signals to the second TRP 205-$b$ b via a communications link 210-$d$. In this example, the signals may be effectively received by the first TRP 205-$a$. However, the signals transmitted to the second TRP 205-$b$ may be deflected, blocked, or otherwise interfered with by an obstruction 215, such as a truck. In this example, the signals may not be received from the third UE 115-$c$ at the second TRP 205-$b$ due to the obstruction 215. Additionally or alternatively, signals which are received at the second TRP 205-$b$ may suffer from low signal quality as compared to the signals received by the first TRP 205-$a$.

These differences in channel qualities and/or signal qualities perceived by the respective TRPs 205 may result in issues experienced by the multi-TRP UE 115-$a$ which are not experienced by other UEs 115 (e.g., single-TRP UEs 115). For example, the differences in channel/signal qualities may result in difficulties in transmitting and/or receiving SLSSs. In this regard, techniques for transmission and reception of SLSSs in the context of multi-TRP UEs 115 are described. For example, the techniques described herein may enable the multi-TRP UE 115-$a$ of the wireless communications system 200 to efficiently and effectively determine whether the it should relay received SLSSs to other UEs 115 within the wireless communications system 200. For example, techniques described herein may enable the multi-TRP UE 115-$a$ to perform measurements of SLSSs received at the first TRP 205-$a$ and the second TRP 205-$b$, and compare the measurements to one or more measurement thresholds to determine whether or not the multi-TRP UE 115-$a$ should relay the received SLSSs to other UEs 115 within the wireless communications system 200. Additionally, in the event the multi-TRP UE 115-$a$ determines that it may relay SLSSs, the techniques described herein may enable the multi-TRP UE 115-$a$ to determine which TRP(s) 205 the multi-TRP UE 115-$a$ should use to transmit (e.g., relay) the SLSSs. Attendant advantages of the techniques described herein may be further shown and described with reference to FIG. 3.

Figure 3:
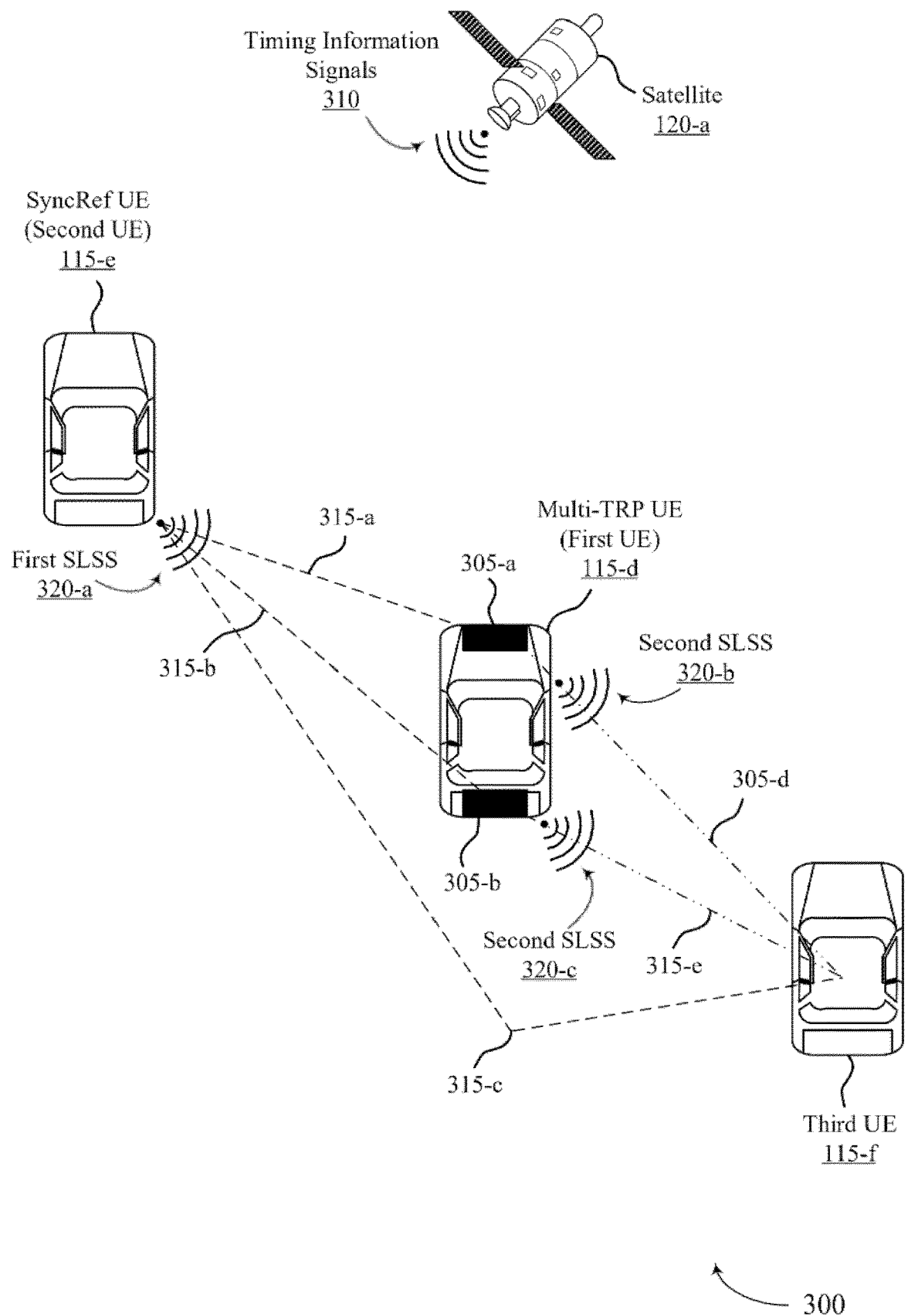
FIG. 3 illustrates an example of a wireless communications system that supports techniques for SLSS transmission with multi-TRP UEs in accordance with aspects of the present disclosure.

FIG. 3 illustrates an example of a wireless communications system 300 that supports techniques for SLSS transmission with multi-TRP UEs in accordance with aspects of the present disclosure. In some examples, wireless communications system 300 may implement aspects of wireless communications system 100 or 200. The wireless communications system 300 may include a first UE 115-$d$, a second UE 115-$e$, and a third UE 115-$f$, which may be examples of UEs 115 described with reference to FIG. 1. Additionally, the wireless communications system 300 may include a satellite 120-$a$, which may be an example of satellites 120 described with reference to FIG. 1.

In some aspects, the first UE 115-$a$ may include a multi-TRP UE 115-$d$, as described previously herein with reference to FIGS. 1-2. In this regard, the first UE 115-$d$ may include a first TRP 305-$a$ and a second TRP 305-$b$ different from the first TRP 305-$a$. The TRPs 305-$a$ and 305-$b$ may be configured to transmit signals in conjunction with one another, individually (e.g., separately from one another), or both. In this regard, the TRPs 305 may include, but are not limited to, antennas, antenna panels, and the like.

The UEs 115 of the wireless communications system 300 may communicate with one another via communications links. For example, the second UE 115-e may communicate with the first UE 115-d via communications links 315-a and 315-b, and may communicate with the third UE 115-f 105-b via a communications link 315-c. The communications links 315-a, 315-b, and 315-c may be examples of sidelink communication links (e.g., PC5 links). In this regard, the communications links 315-a, 315-b, and 315-c may include bi-directional links between the respective UEs 115-d, 115-e, and 115-f. In some aspects, each of the respective TRPs 305 may communicate with other wireless devices (e.g., satellite 120-a, UEs 115) within the wireless communications system 300 via separate communications links 315. For example, the first TRP 305-a of the first UE 115-d may transmit and/or receive signals from the second UE 115-e via the communications link 315-a. Similarly, the second TRP 305-b of the first UE 115-d may transmit and/or receive signals from the second UE 115-e via the communications link 315-b. In some aspects, the first UE 115-d and the third UE 115-f may additionally communicate with one another via one or more communications links (e.g., sidelink communication links, PC5 links). For example, the first TRP 305-a of the first UE 115-d may communicate with the third UE 115-f via a communications link 315-d, and the second TRP 305-a of the first UE 115-d may communicate with the third UE 115-f via a second communications link 315-e.

For efficient communications within a wireless communications system, the respective wireless devices of the wireless communications system may synchronize internal clocks with each other and the network. By synchronizing internal clocks with the network, the wireless devices may ensure that wireless transmissions may be efficiently exchanged with other wireless devices. In some aspects, timing information may be transmitted by the network (e.g., satellites, base stations) to the respective UEs with the wireless communications system. However, as noted previously herein, every wireless device within a wireless communications system may not be able to receive timing information directly from the network. For example, as shown in FIG. 3, the second UE 115-e may be able to receive timing information signals 310 directly from a satellite 120-a associated with the network. The timing information signals 310 may include an absolute or relative time associated with the wireless communications system 300. Comparatively, the first UE 115-d and the third UE 115-f may be unable to receive the timing information signals 310 directly from the satellite 120-a due to the relative positioning of the UEs 115-d and 115-f with respect to the satellite, distances from the satellite, terrestrial obstructions, noise, or other interference.

In such cases, UEs 115 which are able to receive timing information signals 310 from the network may be configured to transmit SLSSs to other UEs 115 within the wireless communications system. For example, the second UE 115-e may receive timing information signals 310 from the satellite 120-a, and may transmit SLSSs 320-a to the first UE 115-d and the second UE 115-f. In this regard, the second UE 115-e may be regarded as a SyncRef UE 115 due to the fact that that it transmits SLSSs 320-a to other UEs 115 within the system. The SLSSs 320-a may include timing information associated with the wireless communications system 300. In this regard, the second UE 115-e may synchronize its internal clocks baed on the received timing information signals, and the first UE 115-d and the third UE 115-f may synchronize their internal clocks based on (e.g., using) the received SLSSs 320-a.

Upon receiving the first SLSS 320-a, each of the first UE 115-d and the third UE 115-f may determine whether or not the respective UEs 115 should "relay" the received SLSSs 320 to additional UEs 115 within the system (e.g., whether they should also become SyncRef UEs 115). For example, the third UE 115-f (e.g., single-TRP UE 115-f) may determine whether or not it should relay the SLSSs 320 to additional UEs 115 based on a strength (e.g., RSSI, RSRP, RSRQ) of the received SLSSs 320. For instance, if the strength (e.g., RSRP) of the received SLSS 320-a is above a given threshold (e.g., RSRP>$Thresh_{RSRP}$), the third UE 115-f may determine that the SLSSs 320-a are strong enough to reach additional UEs 115 within the system, and may thereby refrain from relaying SLSSs 320. Conversely, if the strength of the received SLSSs 320-a is below a given threshold (e.g., RSRP<$Thresh_{RSRP}$), the third UE 115-f may determine that the SLSSs 320-a may not be strong enough to reach additional UEs 115 within the system, and may thereby determine to relay the SLSSs 320-a to additional UEs 115.

However, this process of determining whether or not to relay SLSSs 320-a which is used by single-TRP UEs 115 may not be compatible in the context of multi-TRP UEs 115. For example, the first SLSSs 320-a received at the first TRP 305-a of the first UE 115-d may be above a respective threshold (e.g., $RSRP_{TRP1}$>$Thresh_{RSRP}$), while the first SLSSs 320-a received at the second TRP 305-b may be below the respective threshold (e.g., $RSRP_{TRP2}$<$Thresh_{RSRP}$). In such cases, the first UE 115-d may be unable to determine whether or not it should relay the first SLSSs 320-a by using conventional techniques. Additionally, if the first UE 115-c determines that it is going to relay SLSSs 320, the differences in signals strengths/qualities associated with the respective TRPs 305 may make it difficult to determine which TRPs 305 should be used to relay the SLSSs 320.

Accordingly, to address issues associated with conventional SLSS transmission/reception techniques, the wireless communications system 300 may support techniques for transmitting and receiving SLSSs 320 by multi-TRP UEs 115. Specifically, the techniques described herein may enable multi-TRP UEs 115 (e.g., first UE 115-d) of the wireless communications system 300 to efficiently and effectively determine whether the respective multi-TRP UEs 115 should relay received SLSSs 320 to other UEs 115 within the wireless communications system 300. Additionally, in the event a multi-TRP UE 115 (e.g., first UE 115-d) determines that it may relay SLSSs 320, the techniques described herein may enable the multi-TRP UE 115 to determine which TRP(s) 305 the multi-TRP UE 115 should use to transmit (e.g., relay) the SLSSs 320.

For example, the satellite 120-b (and/or a base station 105) may transmit control messages to the first UE 115-d, the second UE 115-e, the third UE 115-f, or any combination thereof. The control messages may include, but are not limited to, RRC messages. In some aspects, the control messages may include an indication of a set of resources each of the respective UEs 115 may use to receive timing information signals 310 from the satellite 120-b. Additionally or alternatively, the control messages may include an indication of a set of resources which may be used for exchanging SLSSs 320 between the respective UEs 115. The sets of resources may include sets of time resources, sets of frequency resources, sets of spatial resources, or any combination thereof.

In some aspects, the satellite 120-b (and/or a base station 105) may transmit timing information signals 310 to the UEs 115-d, 115-e, and/or 115-f. In some aspects, the timing information signals 310 may be received by all of the UEs 115, or only a subset of the UEs 115. For example, as shown in FIG. 3, the timing information signals 310 may be received by only the second UE 115-e. The timing information signals 310 may include an absolute or relative time associated with the wireless communications system 300. In this regard, the second UE 115-e may synchronize (e.g., selectively adjust) one or more internal timers or clocks based on the received timing information signals 310. In some aspects, the satellite 120-b may transmit the timing information signals 310 based on transmitting the control messages to the UEs 115. In this regard, the second UE 115-e may receive the timing information signals 310 based on (e.g., according to, using) the set of resources for receiving timing information signals 310 from the satellite 120-b which were indicated in the received control message.

In some aspects, the first UE 115-d may determine a set of resources associated with receiving SLSSs 320 (e.g., first SLSS 320-a) from another UE 115, a set of resources associated with transmitting SLSSs 320 (e.g., second SLSS 320-b and 320-c) to another UE 115, or both. In some cases, the first UE 115-d may determine the set(s) of resources for transmitting/receiving SLSSs 320 based on the control message received from the satellite 120-b. For example, the control message may indicate a set of resources which are to be used by the first UE 115-d to transmit and receive SLSSs 320. In this example, the first UE 115-d may determine a first subset of the set of resources which are to be used for receiving SLSSs 320 (e.g., first SLSS 320-a) from another UE 115 (e.g., second UE 115-e), and a second subset of the set of resources which are to be used for transmitting SLSSs 320 (e.g., second SLSS 320-b and 320-c) to another UE 115 (e.g., third UE 115-f).

Upon receiving the timing information signals 310, the second UE 115-d may transmit the first SLSS 320-a to the first UE 115-d, the second UE 115-f, or both. For example, the second UE 115-e may transmit the first SLSS 320-a to the first TRP 305-a via communications link 315-a, to the second TRP 305-b via the communications link 315-b, and to the third UE 115-f via the communications link 315-c. The second UE 115-e may transmit the first SLSS 320-a using unicast techniques, groupcast (e.g., multicast) techniques, broadcast techniques, or any combination thereof. The second UE 115-e may transmit the first SLSS 320-e based on receiving the control message from the satellite 120-b, receiving the timing information signals 310, or both. In some cases, the first SLSS 320-a may be received by both the first UE 115-d, the third UE 115-f, or only by a subset of the UEs 115-d and UE 115-f. For example, the third UE1 115-f may be out of range, obstructed, or otherwise prevented from receiving the first SLSS 320-a such that the first SLSS 320-a is received only by the first UE 115-d (e.g., first and second TRP 305-a and 305-b). In some cases, the first UE 115-d may synchronize (e.g., selectively adjust) one or more internal timers or clocks based on the first SLSS 320-a.

In some aspects, the first UE 115-d may receive the first SLSS 320-a at the first TRP 305-a and the second TRP 305-b. Additionally or alternatively, the first UE 115-d may receive the first SLSS 320-a based on the determined SLSS resources. For example, in cases where the first UE 115-d determines a first subset of a set of resources which are to be used for receiving the first SLSS 320-a, and a second subset of the set of resources which are to be used for transmitting the second SLSS 320-b and 320-d, the first UE 115-d may receive the first SLSS 320-a based on (e.g., using) the first subset of the set of resources.

In some aspects, the first UE 115-d may perform a first set of measurements on the first SLSS 320-a received at the first TRP 305-a, and a second set of measurements on the first SLSS 320-a received at the second TRP 305-b. The sets of measurements may include RSSI measurements, RSRP measurements, RSRQ measurements, SNR measurements, SINR measurements, or any combination thereof. The first UE 115-d may perform the sets of measurements based on receiving the control message from the satellite 120-b, determining the resources for receiving/transmitting SLSSs 320, receiving the first SLSS 320-a, or any combination thereof.

In some aspects, the first UE 115-d may estimate a beam direction(s) of the first SLSS 320-a. The beam direction may include a direction in which the first SLSS 320-a was received by the first TRP 305-a, the second TRP 305-b, or both. In some aspects, the first UE 115-d may estimate the beam direction of the first SLSS 320-a based on the first set of measurements, the second set of measurements, or both. For example, in cases where the first UE 115-d determines that an RSRP measurement within the first set of measurements associated with the first TRP 305-a is greater than an RSRP measurement within the second set of measurements associated with the second TRP 305-b, the first UE 115-d may determine that the second UE 115-e is closer to the first TRP 305-a, and may estimate the beam direction based on the first and second RSRP measurements.

Upon performing the sets of measurements, the first UE 115-d may compare the first set of measurements, the second set of measurements, or both, to one or more measurement thresholds. The one or more measurement thresholds may include, but are not limited to, RSSI thresholds, RSRP thresholds, RSRQ thresholds, SNR thresholds, SINR thresholds, or any combination thereof. The first UE 115-d may determine whether the first and/or second sets of measurements satisfy the one or more measurement thresholds.

In some cases, a set of measurements may be said to "satisfy" the respective measurement threshold(s) if the set of measurements indicates a poor link/signal quality with respect to the measurement threshold. For example, in the case of RSRP, RSRQ, or RSRQ measurements, the respective measurements may be determined to satisfy the respective measurement thresholds (e.g., $Thresh_{RSSI}$, $Thresh_{RSRP}$, $Thresh_{RSRQ}$) if the measurements are less than or equal to the respective measurement thresholds (e.g., threshold satisfied if $RSSI \leq Thresh_{RSSI}$, $RSRP \leq ThreSh_{RSRP}$, $RSRQ \leq Thresh_{RSRQ}$). Comparatively, the respective measurements may be determined not to satisfy the respective measurement thresholds if the measurements are greater than the respective measurement thresholds (e.g., threshold not satisfied if $RSSI > Thresh_{RSSI}$, $RSRP > Thresh_{RSRP}$, $RSRQ > Thresh_{RSRQ}$).

In some cases, the first UE 115-d may compare the first set of measurements and the second set of measurements to a single measurement threshold. For example, the first set of measurements may include a first RSRP measurement ($RSRP_{TRP1}$), and the second set of measurements may include a second RSRP measurement ($RSRP_{TRP2}$). In this example, the first UE 115-d may compare the first and second RSRP measurements to a single RSRP threshold. In cases where the first UE 115-d determines that neither the first RSRP measurement nor the second RSRP measurement satisfy the RSRP threshold ($RSRP_{TRP1} > Thresh_{RSRP}$ and $RSRP_{TRP2} > Thresh_{RSRP}$), the first UE 115-d may refrain from transmitting (e.g., relaying) the second SLSS 320-b and 320-c.

In some aspects, the first UE 115-d may refrain from transmitting the second SLSS 320-b and 320-c based on the sets of measurements failing to satisfy the respective measurement thresholds. In this regard, the first UE 115-d may determine that the first SLSS 320-a exhibits sufficient power or quality to reach other UEs 115 (e.g., third UE 115-f) within the wireless communications system 300 based on the sets of measurements satisfying the respective measurement thresholds. Accordingly, the first UE 115-d may refrain from transmitting (e.g., relaying) the second SLSS 320-b and 320-c due to the fact that the first SLSS 320-a may effectively reach other UEs 115 within the system.

Conversely, the first UE 115-d may determine that the first RSRP measurement and/or the second RSRP measurement satisfies the RSRP threshold (e.g., $RSRP_{TRP1} \leq Thresh_{RSRP}$ and/or $RSRP_{TRP2} \leq Thresh_{RSRP}$). In cases where one or both of the sets of measurements (e.g., first RSRP measurement, second RSRP measurement) satisfy the respective measurement threshold(s), the first UE 115-d may transmit (e.g., relay) the second SLSS 320-b and/or 320-c to the third UE 115-f. The first UE 115-d may transmit the second SLSS 320-b, 320-c using unicast techniques, groupcast (e.g., multicast) techniques, broadcast techniques, or any combination thereof.

In some aspects, the first UE 115-d may transmit the second SLSS 320-b and/or 320-c based on the first set of measurements, the second set of measurements, or both, satisfying the one or more measurement thresholds. Accordingly, the first UE 115-d may transmit the second SLSS 320-b, 320-c based on receiving the control message from the satellite 120-b, determining the resources for transmitting/receiving SLSS 320, receiving the first SLSS 320-a, performing the sets of measurements at the TRPs 305-a and 305-b, estimating the beam direction of the first SLSS 320-a, comparing the sets of measurements to the one or more measurement thresholds, or any combination thereof.

For example, in cases where both the first set of measurements and the second set of measurements satisfy the one or more measurement thresholds, (e.g., $RSSI_{TRP1,TRP2} \leq Thresh_{RSSI}$, $RSRP_{TRP1,TRP2} \leq Thresh_{RSRP}$, $RSRQ_{TRP1,TRP2} \leq Thresh_{RSRQ}$), the first UE 115-d may determine to transmit the second SLSS 320-b, 320-c. In this example, the first UE 115-d may transmit the second SLSS 320-b using the first TRP 305-a, may transmit the second SLSS 320-c using the second TRP 305-b, or both, based on both sets of measurements associated with each of the TRPs 305 satisfying the respective measurements thresholds.

Additionally or alternatively, the first UE 115-d may transmit the second SLSS with only one of the TRPs 305 based on the sets of measurements, the estimated beam direction, and the like. For example, the first UE 115-d may determine to transmit the second SLSS 320-b, 320-c if only one of the first set of measurements or the second set of measurements satisfies the one or more thresholds. For instance, the first UE 115-d may determine that the second set of measurements satisfies the one or more measurement thresholds (e.g., $RSSI_{TRP2} \leq Thresh_{RSSI}$, $RSRP_{TRP2} \leq Thresh_{RSRP}$, $RSRQ_{TRP2} \leq Thresh_{RSRQ}$), but may determine that the first set of measurements fail to satisfy the one or more measurement thresholds (e.g., $RSSI_{TRP1} > Thresh_{RSSI}$, $RSRP_{TRP1} > Thresh_{RSRP}$, $RSRQ_{TRP1} > Thresh_{RSRQ}$). In this example, the first UE 115-d may determine to transmit the second SLSS 320-b, 320-c based on the second set of measurements satisfying the one or more measurement thresholds.

Continuing with the same example, the first UE 115-d may transmit the second SLSS 320-b, 320-c using the second TRP 305-b and/or the first TRP 305-a. For example, the first UE 115-d may transmit the second SLSS 305-c using the second TRP 305-b based on determining that the second set of measurements satisfy the one or more measurement thresholds, determining that the first set of measurements fail to satisfy the one or more measurements thresholds, or both. In some cases, the first UE 115-d may transmit the second SLSS 320-a using the second TRP 305-b and may refrain from transmitting the second SLSS 320-b using the first TRP 305-a based on determining that the first set of measurements fail to satisfy the one or more measurement thresholds. In some cases, the first TRP 305-b may refrain from transmitting the second SLSS 320-b by transmitting nulls using the same set of resources (e.g., same subcarriers) which are used to transmit the second SLSS 320-c by the second TRP 305-b. Additionally or alternatively, in other cases, the first UE 115-d may transmit the second SLSS 320-b, 320-c using both the first TRP 305-a and the second TRP 305-b based on the second set of measurements satisfying the measurement threshold(s), and despite the first set of measurements failing to satisfy the measurement threshold(s).

In some aspects, the first UE 115-d may transmit (e.g., relay) the second SLSS 320-b, 320-c from the first TRP 305-a and/or the second TRP 305-b based on (e.g., according to) the estimated beam direction(s) of the first SLSS 320-a. For example, in cases where the first UE 115-d estimates the beam direction of the first SLSS 320-a, the first UE 115-d may transmit the second SLSS 320-b, 320-c along a beam direction which is equivalent to (or substantially equivalent to) the estimated beam direction.

Additionally or alternatively, the first UE 115-d may transmit the second SLSS 320-b, 320-c (or nulls) based on the SLSS resources determined for transmitting/receiving SLSSs 320. For example, in cases where the first UE 115-d determines a first subset of a set of resources which are to be used for receiving the first SLSS 320-a, and a second subset of the set of resources which are to be used for transmitting the second SLSSs 320-b, 320-c, the first UE 115-d may transmit (e.g., relay) the second SLSS 320-b, 320-c based on (e.g., using) the second subset of the set of resources. For instance, the first UE 115-d may receive the first SLSS 320-a using a first set of slots of the set of resources (e.g., receive first SLSS 320-a on slots 4 and 8), and may transmit the second SLSS 320-b, 320-c using a second set of slots of the set of resources (e.g., transmit second SLSS 320-b, 320-c on slots 2 and 6).

In additional or alternative cases, the first UE 115-d may compare the first and second sets of measurements associated with the first and second TRPs 305-a and 305-b to multiple measurement thresholds (e.g., first/second measurement thresholds, upper/lower measurement thresholds). For example, the first UE 115-d may compare the first and second sets of measurements to a first measurement threshold (e.g., lower bound measurement threshold). For instance, the first UE 115-d may determine that a first RSRP measurement of the first set of measurements, a second RSRP measurement associated with the second set of measurements, or both, satisfy a first (lower) measurement threshold (e.g., $RSRP_{TRP1} \leq LowerThresh_{RSRP}$ and/or $RSRP_{TRP2} \leq LowerThresh_{RSRP}$).

In cases where the first set of measurements, the second set of measurements, or both, satisfies the first measurement threshold the first UE 115-*d* may initiate one or more timers based on the first set of measurements, the second set of measurements, or both, satisfying the first measurement threshold (e.g., LowerThresh$_{RSRP}$). In some aspects, the first UE 115-*d* may utilize a single timer for both the first TRP 305-*a* and the second TRP 305-*b* (e.g., timer associated with both the first TRP 305-*a* and the second TRP 305-*b*). For example, in cases where either the first set of resources, the second set of resources, or both, satisfy the first measurement threshold, the first UE 115-*d* may initiate the single timer associated with the both the first and second TRPs 305.

In additional or alternative aspects, the first UE 115-*d* may be configured to operate separate timers for each of the TRPs 305. In this regard, the UE 115-*d* may operate a first timer associated with the first TRP 305-*a* and a second timer associated with the second TRP 305-*b*. In such cases, the timers may be operated (e.g., initiated, deactivated) independently of one another. For example, in cases where the first set of measurements satisfies the first measurement threshold but the second set of measurements fails to satisfy the first measurement threshold (e.g., ≤LowerThresh$_{RSRP}$), the first UE 115-*d* may initiate the second timer associated with the second TRP 305-*b* based on the second set of measurements failing to satisfy the first measurement threshold. In this example, the first UE 115-*d* may or may not initiate the first timer associated with the first TRP 305-*b* based on initiating the second timer. In this regard, the first UE 115-*d* may initiate separate timers associated with each of the TRPs 305 based on the respective sets of measurements associated with the respective TRPs 305 satisfying the first measurement threshold.

In some aspects, the one or more timers may be associated with predetermined or preconfigured duration (e.g., preconfigured expiration time). The expiration times associated with each of the timers may be the same or different. Moreover, the expiration times associated with the one or more timers may be signaled to the first UE 115-*d* via control/configuration signaling, may be preconfigured by the first UE 115-*d*, or both. In some cases, the first UE 115-*d* may selectively adjust expiration times associated with the one or more timers based on determined channel conditions, a distance between the first UE 115-*d* and other UEs 115 within the system, or any combination thereof.

In some aspects, the first UE 115-*d* may deactivate the one or more timers based on the first set of measurements, the second set of measurements, or both, satisfying a second measurement threshold (e.g., UpperThresh$_{RSRP}$) which is different from the first measurement threshold (e.g., LowerThresh$_{RSRP}$). In some aspects, the respective sets of measurements may be determined to "satisfy" the second measurement threshold if the sets of measurements indicate a quality/strength of the first SLSS 320-*a* is greater than or equal to the second measurement threshold (e.g., second measurement threshold satisfied if RSSI$_{TRP1,TRP2}$≥UpperThresh$_{RSSI}$, RSRP$_{TRP1,TRP2}$≥UpperThresh$_{RSRP}$, RSRQ$_{TRP1,TRP2}$≥UpperThresh$_{RSRQ}$). In this regard, the first UE 115-*d* may activate the one or more timers if a strength/quality associated with the first SLSS 320-*a* drops below a predetermined level/threshold, and may deactivate the one or more timers if the strength/quality associate with the first SLSS 320-*a* rises above a second predetermined level/threshold.

For example, in cases where the first UE 115-*d* initiates a single timer based on the first and/or second set of measurements satisfying the first measurement threshold, the first UE 115-*d* may deactivate the single timer if the first set of measurements, the second set of measurements, or both, are subsequently determined to satisfy the second measurement threshold. By way of another example, in cases where the first UE 115-*d* operates (e.g., initiates, deactivates) separate timers associated with the respective TRPs 305, the first UE 115-*d* may deactivate the timer associated with a respective TRP 305 if the set of measurements associated with the respective TRP 305 are subsequently found to satisfy the second measured threshold. For instance, the first UE 115-*d* may initiate the second timer associated with the second TRP 305-*b* if the second set of measurements associated with the second TRP 305-*b* satisfy the first measurement threshold (e.g., initiate second timer if RSRP$_{TRP2}$≤LowerThresh$_{RSRP}$). Subsequently, the first UE 115-*d* may deactivate the second timer if the second set of measurements associated with the second TRP 305-*b* are found to satisfy the second measurement threshold (e.g., deactivate second timer if RSRP$_{TRP2}$≥UpperThresh$_{RSRP}$).

In some aspects, the first UE 115-*d* may determine whether or not to deactivate the timers at regular or irregular intervals throughout the expiration time of the timers. In cases where the first UE 115-*d* determines that the one or more timers are deactivated (e.g., second measurement threshold satisfied before the timers expire), the first UE 115-*d* may refrain from transmitting the second SLSS 320-*b*, 320-*c* based on the deactivation of the one or more timers, as discussed previously herein.

Conversely, if the first UE 115-*d* determines an expiration of the timers before the second measurement threshold is satisfied, the first UE 115-*d* may transmit (e.g., relay) the second SLSS 320-*b*, 320-*c*. In some aspects, the first UE 115-*d* may determine an expiration of the timers based on a duration of each of the respective timers, a time that each timer was initiated, or both. For example, the UE 115-*d* may determine an expiration of a timer if the first UE 115-*d* determines that the second measurement threshold has not been satisfied within the expiration time of the timer. As noted previously herein, the first UE 115-*d* may determine an expiration of a single timer associated with both TRPs 305, may independently determine an expiration of separate timers associated with the respective TRPs 305, or both.

Upon determining the expiration of the timers, the first UE 115-*d* may transmit the second SLSS 320-*b*, 320-*c* based on the expiration of the one or more timers. In some aspects, the first UE 115-*d* may transmit the second SLSS 320 only with the TRP 305 associated with the expired timer, with both TRPs 305, or both. For example, if the first UE 115-*d* determines an expiration of the second timer associated with the second TRP 305-*b*, the first UE 115-*d* may transmit the second SLSS 320-*c* using only the second TRP 305-*b*. By way of example, if the first UE 115-*d* determines an expiration of the second timer associated with the second TRP 305-*b*, the first UE 115-*d* may transmit the second SLSS 320-*c* using the second TRP 305-*b* and may transmit the second SLSS 320-*bc* using the first TRP 305-*a*.

Techniques described herein may enable the first UE 115-*d* (e.g., multi-TRP UE 115-*d*) to effectively determine whether the first UE 115-*d* should relay SLSSs 320 to other UEs 115 within the wireless communications system 300. In particular, by comparing measurements performed at the multiple TRPs 305 to one or more measurement thresholds, the first UE 115-*d* may be able to efficiently determine whether the first ULE 115-*d* should become a SyncRef UE 115 to improve distribution of SLSSs 320 throughout the wireless communications system 300. Accordingly, by improving the efficiency and reliability of SLSS 320 distribution, techniques described wherein may improve clock synchronization among UEs 115 within the wireless communications system 300, thereby leading to improved wireless communications and improved user experience.

Figure 4:
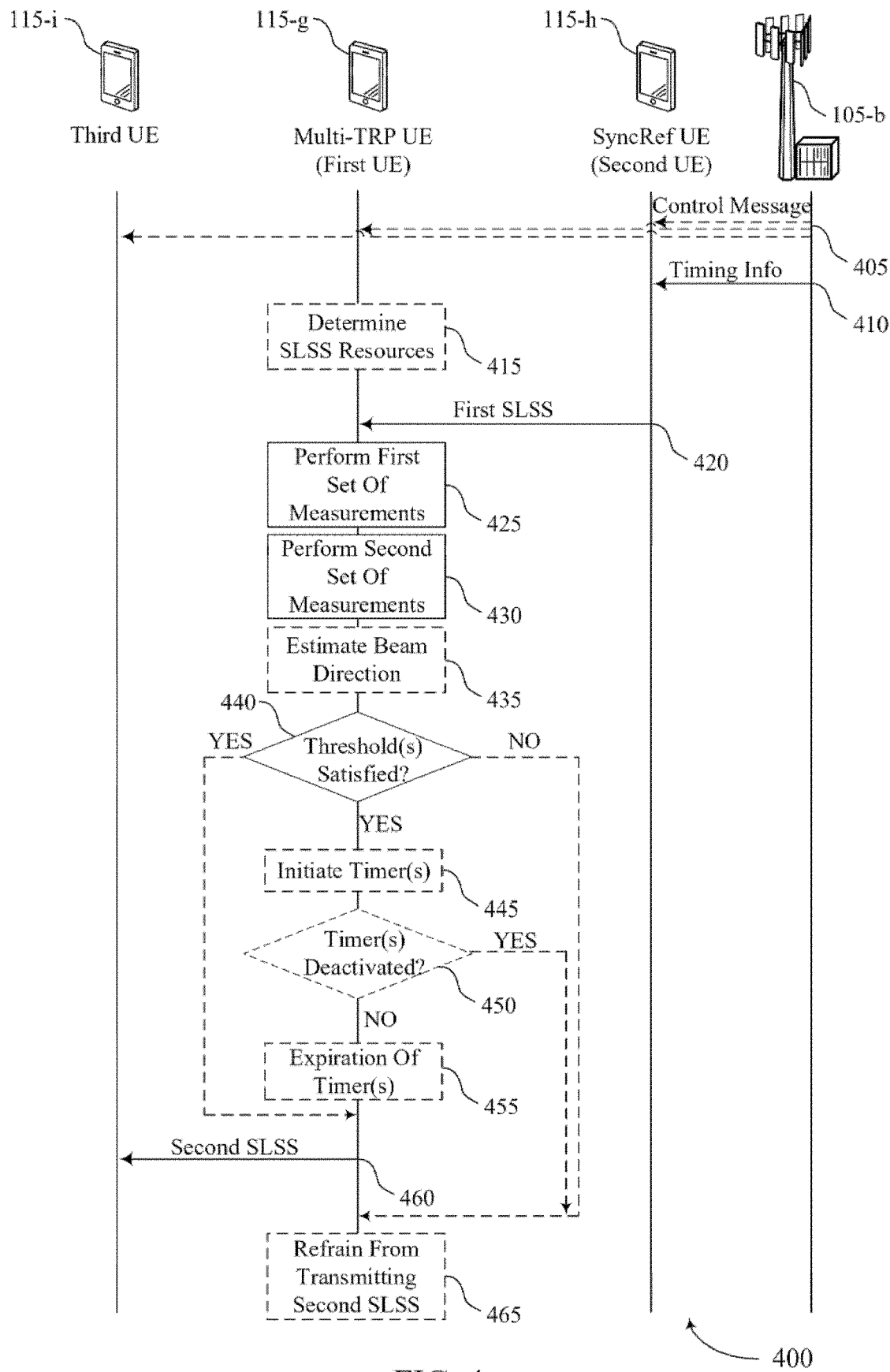
FIG. 4 illustrates an example of a process flow that supports techniques for SLSS transmission with multi-TRP UEs in accordance with aspects of the present disclosure.

FIG. 4 illustrates an example of a process flow 400 that supports techniques for SLSS transmission with multi-TRP UEs in accordance with aspects of the present disclosure. In some examples, process flow 400 may implement, or be implemented by, aspects of wireless communications system 100, 200, 300, or any combination thereof. For example, the process flow 400 may illustrate a first UE 115-g receiving a first SLSS from a second UE 115-h, determining whether parameters associated with the first SLSS satisfy one or more parameter thresholds, and transmitting a second SLSS to a third UE 115-i, as described with reference to FIGS. 1-3.

In some cases, process flow 400 may include a first UE 115-g, a second UE 115-h, a third UE 115-i, and a base station 105-b, which may be examples of corresponding devices as described herein. The first UE 115-g, the second UE 115-h, and the third UE 115-i illustrated in FIG. 4 may be examples of the first UE 115-d, the second UE 115-e, and the third UE 115-f, respectively, illustrated in FIG. 3. In this regard, the first UE 115-g may include a multi-TRP UE 115, and the second UE 115-h may include a SyncRef UE 115. In some aspects, the respective UEs 115 illustrated in FIG. 4 may communicate with one another via sidelink communications links, such as the communications links 315-a, 315-b, and 315-c illustrated in FIG. 3.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the base station 105-b may transmit a control message to the first UE 115-g, the second UE 115-h, the third UE 115-i, or any combination thereof. The control messages may include, but is not limited to, RRC messages. In some aspects, the control message may include an indication of a set of resources each of the respective UEs 115 may use to receive timing information signals from the base station 105-b. Additionally or alternatively, the control messages may include an indication of a set of resources which may be used for exchanging SLSSs between the respective UEs 115. The sets of resources may include sets of time resources, sets of frequency resources, sets of spatial resources, or any combination thereof.

At 410, the base station 105-b may transmit timing information signals. In some aspects, the timing information signals may be received by all of the UEs 115, or only a subset of the UEs 115. For example, as shown in FIG. 4, the timing information signals may be received by only the second UE 115-h. The timing information signals may include an absolute or relative time associated with the wireless communications system. In this regard, the second UE 115-h may synchronize (e.g., selectively adjust) one or more internal timers or clocks based on the received timing information signals. In some aspects, the base station 105-d may transmit the timing information signals at 410 based on transmitting the control messages at 405. In this regard, the second UE 115-h may receive the timing information signals based on (e.g., according to, using) the set of resources for receiving timing information signals from the base station 105-b which were indicated in the control message.

At 415, the first UE 115-g may determine a set of resources associated with receiving SLSS signals from another UE 115, a set of resources associated with transmitting SLSS signals to another UE 115, or both. In some cases, the first UE 115-g may determine the set(s) of resources at 415 based on the control message received at 405. For example, the control message may indicate a set of resources which are to be used by the UEs 115 to exchange SLSSs. In this example, the first UE 115-g may determine a first subset of the set of resources which are to be used for receiving SLSSs from another UE 115, and a second subset of the set of resources which are to be used for transmitting SLSSs to another UE 115.

At 420, the second UE 115-h may transmit a first SLSS to the first UE 115-g, the second UE 115-i, or both. The second UE 115-h may transmit the first SLSS using unicast techniques, groupcast (e.g., multicast) techniques, broadcast techniques, or any combination thereof. The second UE 115-h may transmit the first SLSS based on receiving the control message at 405, receiving the timing information signals at 410, or both. In some cases, the first SLSS may be received by both the UEs 115-g and 115-i, or only by a subset of the UEs 115-g and UE 115-i. For example, as shown in FIG. 4, the third UE1 115-c may be out of range, obstructed, or otherwise prevented from receiving the first SLSS such that the first SLSS is received only by the first UE 115-g. In some cases, the first UE 115-g may synchronize (e.g., selectively adjust) one or more internal timers or clocks based on the first SLSS.

In some aspects, the first UE 115-g may receive the first SLSS at a first TRP and a second TRP different from the first TRP. Additionally or alternatively, the first UE 115-g may receive the first SLSS based on the SLSS resources determined at 415. For example, in cases where the first UE 115-g determines a first subset of a set of resources which are to be used for receiving SLSSs from another UE 115, and a second subset of the set of resources which are to be used for transmitting SLSSs to another UE 115, the first UE 115-g may receive the first SLSS at 420 based on (e.g., using) the first subset of the set of resources.

At 425, the first UE 115-g may perform a first set of measurements on the first SLSS received at the first TRP of the first UE 115-g. The first set of measurements may include RSSI measurements, RSRP measurements, RSRQ measurements, SNR measurements, SINR measurements, or any combination thereof. The first UE 115-g may perform the first set of measurements based on receiving the control message at 405, determining the SLSS resources at 415, receiving the first SLSS at 420, or any combination thereof.

At 430, the first UE 115-g may perform a second set of measurements on the first SLSS received at the second TRP of the first UE 115-g. The second set of measurements may include RSSI measurements, RSRP measurements, RSRQ measurements, SNR measurements, SINR measurements, or any combination thereof. The first UE 115-g may perform the second set of measurements based on receiving the control message at 405, determining the SLSS resources at 415, receiving the first SLSS at 420, performing the first set of measurements at 425, or any combination thereof.

At 435, the first UE 115-g may estimate a beam direction of the first SLSS. In some aspects, the first UE 115-g may estimate the beam direction of the first SLSS based on the first set of measurements, the second set of measurements, or both. For example, in cases where the first UE 115-g determines that an RSRP measurement within the first set of measurements associated with the first TRP is greater than an RSRP measurement within the second set of measurements associated with the second TRP, the first UE 115-*g* may determine that the second UE 115-*h* is closer to the first TRP, and may estimate the beam direction based on the first and second RSRP measurements.

At 440, the first UE 115-*g* may compare the first set of measurements, the second set of measurements, or both, to one or more measurement thresholds. The one or more measurement thresholds may include, but are not limited to, RSSI thresholds, RSRP thresholds, RSRQ thresholds, SNR thresholds, SINR thresholds, or any combination thereof. The first UE 115-*g* may determine whether the first and/or second sets of measurements satisfy the one or more measurement thresholds.

In some cases, a set of measurements may be said to "satisfy" the respective measurement threshold(s) if the set of measurements indicates a poor link/signal quality with respect to the measurement threshold. For example, in the case of RSRP, RSRQ, or RSRQ measurements, the respective measurements may be determined to satisfy the respective measurement thresholds (e.g., $\text{Thresh}_{RSSI}$, $\text{Thresh}_{RSRP}$, $\text{Thresh}_{RSRQ}$) if the measurements are less than or equal to the respective measurement thresholds (e.g., threshold satisfied if $\text{RSSI} \leq \text{Thresh}_{RSSI}$, $\text{RSRP} \leq \text{Thresh}_{RSRP}$, $\text{RSRQ} \leq \text{Thresh}_{RSRQ}$). Comparatively, the respective measurements may be determined not to satisfy the respective measurement thresholds if the measurements are greater than the respective measurement thresholds (e.g., threshold not satisfied if $\text{RSSI} > \text{Thresh}_{RSSI}$, $\text{RSRP} > \text{Thresh}_{RSRP}$, $\text{RSRQ} > \text{Thresh}_{RSRQ}$).

In some cases, the first UE 115-*g* may compare the first set of measurements and the second set of measurements to a single measurement threshold. For example, the first set of measurements may include a first RSRP measurement ($\text{RSRP}_{TRP1}$), and the second set of measurements may include a second RSRP measurement ($\text{RSRP}_{TRP2}$). In this example, the first UE 115-*g* may compare the first and second RSRP measurements to a single RSRP threshold. In cases where the first UE 115-*g* determines that neither the first RSRP measurement nor the second RSRP measurement satisfy the RSRP threshold ($\text{RSRP}_{TRP1} > \text{Thresh}_{RSRP}$ and $\text{RSRP}_{TRP2} > \text{Thresh}_{RSRP}$), the process flow 400 may proceed to 465.

At 465, the first UE 115-*g* may refrain from transmitting (e.g., relaying) a second SLSS. The first UE 115-*g* may refrain from transmitting the second SLSS based on the sets of measurements failing to satisfy the respective measurement thresholds at 440. In this regard, the first UE 115-*g* may determine that the first SLSS exhibits sufficient power or quality to reach other UEs 115 (e.g., third UE 115-*i*) within the system based on the sets of measurements satisfying the respective measurement thresholds. Accordingly, the first UE 115-*g* may refrain from transmitting (e.g., relaying) the second SLSS due to the fact that the first SLSS may effectively reach other UEs 115 within the system.

Reference will again be made to 440 of process flow 400. In other cases, the first UE 115-*g* may determine that the first RSRP measurement and/or the second RSRP measurement satisfies the RSRP threshold (e.g., $\text{RSRP}_{TRP1} \leq \text{Thresh}_{RSRP}$ and/or $\text{RSRP}_{TRP2} \leq \text{Thresh}_{RSRP}$). In cases where one or both of the sets of measurements (e.g., first RSRP measurement, second RSRP measurement) satisfy the respective measurement threshold(s), the process flow 400 may proceed to 460.

At 460, the first UE 115-*g* may transmit (e.g., relay) a second SLSS to the third UE 115-*i*. The first UE 115-*h* may transmit the second SLSS using unicast techniques, groupcast (e.g., multicast) techniques, broadcast techniques, or any combination thereof. In some aspects, the first UE 115-*g* may transmit the second SLSS at 460 based on the first set of measurements, the second set of measurements, or both, satisfying the one or more measurement thresholds at 440. Accordingly, the first UE 115-*g* may transmit the second SLSS at 460 based on receiving the control message at 405, determining the SLSS resources at 415, receiving the first SLSS at 420, performing the sets of measurements at 425 and 430, estimating the beam direction at 435, comparing the sets of measurements to the one or more measurement thresholds at 440, or any combination thereof.

For example, in cases where both the first set of measurements and the second set of measurements satisfy the one or more measurement thresholds, (e.g., $\text{RSSI}_{TRP1,TRP2} \leq \text{Thresh}_{RSSI}$, $\text{RSRP}_{TRP1,TRP2} \leq \text{Thresh}_{RSRP}$, $\text{RSRQ}_{TRP1,TRP2} \leq \text{Thresh}_{RSRQ}$), the first UE 115-*g* may determine to transmit the second SLSS at 460. In this example, the first UE 115-*g* may transmit the second SLSS using the first TRP, the second TRP, or both, based on both sets of measurements associated with each of the TRPs satisfying the respective measurements thresholds. Additionally or alternatively, the first UE 115-*g* may transmit the second SLSS with only one of the TRPs based on the sets of measurements, the estimated beam direction, and the like.

By way of another example, the first UE 115-*g* may determine to transmit the second SLSS at 460 if only one of the first set of measurements or the second set of measurements satisfies the one or more thresholds. For instance, at 440, the first UE 115-*g* may determine that the second set of measurements satisfies the one or more measurement thresholds (e.g., $\text{RSSI}_{TRP2} \leq \text{Thresh}_{RSSI}$, $\text{RSRP}_{TRP2} \leq \text{Thresh}_{RSRP}$, $\text{RSRQ}_{TRP2} \leq \text{Thresh}_{RSRQ}$), but may determine that the first set of measurements fail to satisfy the one or more measurement thresholds (e.g., $\text{RSSI}_{TRP1} > \text{Thresh}_{RSSI}$, $\text{RSRP}_{TRP1} > \text{Thresh}_{RSRP}$, $\text{RSRQ}_{TRP1} > \text{Thresh}_{RSRQ}$). In this example, the first UE 115-*g* may determine to transmit the second SLSS at 460 based on the second set of measurements satisfying the one or more measurement thresholds.

Continuing with the same example, the first UE 115-*g* may transmit the second SLSS using the second TRP and/or the first TRP. For example, the first UE 115-*g* may transmit the second SLSS using the second TRP based on determining that the second set of measurements satisfy the one or more measurement thresholds, determining that the first set of measurements fail to satisfy the one or more measurements thresholds, or both. In some cases, the first UE 115-*g* may transmit the second SLSS using the second TRP and may refrain from transmitting the second SLSS using the first TRP based on determining that the first set of measurements fail to satisfy the one or more measurement thresholds. In some cases, the first TRP may refrain from transmitting the second SLSS by transmitting nulls using the same set of resources (e.g., same subcarriers) which are used to transmit the second SLSS by the second TRP. Additionally or alternatively, in other cases, the first UE 115-*g* may transmit the second SLSS using both the first TRP and the second TRP based on the second set of measurements satisfying the measurement threshold(s), and despite the first set of measurements failing to satisfy the measurement threshold(s).

In some aspects, the first UE 115-*g* may transmit (e.g., relay) the second SLSS at 460 from the first TRP and/or the second TRP based on (e.g., according to) the beam direction estimated at 435. For example, in cases where the first UE 115-*g* estimates the beam direction of the first SLSS received at 420, the first UE 115-*g* may transmit the second SLSS along a beam direction which is equivalent to (or substantially equivalent to) the estimated beam direction.

Additionally or alternatively, the first UE 115-g may transmit the second SLSS (or nulls) at 460 based on (e.g., according to, using) the SLSS resources determined at 415. For example, in cases where the first UE 115-g determines a first subset of a set of resources which are to be used for receiving SLSSs from another UE 115, and a second subset of the set of resources which are to be used for transmitting SLSSs to another UE 115, the first UE 115-g may transmit (e.g., relay) the second SLSS at 460 based on (e.g., using) the second subset of the set of resources. For instance, the first UE 115-g may receive the first SLSS using a first set of slots of the set of resources (e.g., receive first SLSS on slots 4 and 8), and may transmit the second SLSS using a second set of slots of the set of resources (e.g., transmit second SLSS on slots 2 and 6).

Reference will again be made to 440 in process flow 400. In additional or alternative cases, the first UE 115-g may compare the first and second sets of measurements associated with the first and second TRPs to multiple measurement thresholds (e.g., first/second measurement thresholds, upper/lower measurement thresholds). For example, at 440, the first UE 115-g may compare the first and second sets of measurements to a first measurement threshold (e.g., lower bound measurement threshold). For instance, the first UE 115-g may determine that a first RSRP measurement of the first set of measurements, a second RSRP measurement associated with the second set of measurements, or both, satisfy a first (lower) measurement threshold (e.g., $RSRP_{TRP1} \leq LowerThresh_{RSRP}$ and/or $RSRP_{TRP2} \leq LowerThresh_{RSRP}$). In cases where the first set of measurements, the second set of measurements, or both, satisfies the first measurement threshold at 440, the process flow may proceed to 445.

At 445, the first UE 115-g may initiate one or more timers based on the first set of measurements, the second set of measurements, or both, satisfying the first measurement threshold (e.g., $LowerThresh_{RSRP}$). In some aspects, the UE 115-g may utilize a single timer for both the first TRP and the second TRP (e.g., timer associated with both the first TRP and the second TRP). For example, in cases where either the first set of resources, the second set of resources, or both, satisfy the first measurement threshold, the first UE 115-g may initiate the single timer associated with the both the first and second TRPs.

In additional or alternative aspects, the first UE 115-g may be configured to operate separate timers for each of the TRPs. In this regard, the UE 115-g may operate a first timer associated with the first TRP and a second timer associated with the second TRP. In such cases, the timers may be operated (e.g., initiated, deactivated) independently of one another. For example, in cases where the first set of measurements satisfies the first measurement threshold but the second set of measurements fails to satisfy the first measurement threshold, the first UE 115-g may initiate the second timer associated with the second TRP based on the second set of measurements failing to satisfy the first measurement threshold. In this example, the first UE 115-g may or may not initiate the first timer associated with the first TRP based on initiating the second timer. In this regard, the first UE 115-g may initiate separate timers associated with each of the TRPs based on the respective sets of measurements associated with the respective TRPs satisfying the first measurement threshold.

At 450, the first UE 115-g may determine whether or not the one or more timers activated at 445 have been deactivated. In some aspects, the first UE 115-g may deactivate the one or more timers based on the first set of measurements, the second set of measurements, or both, satisfying a second measurement threshold (e.g., $UpperThresh_{RSRP}$) which is different from the first measurement threshold. In some aspects, the respective sets of measurements may be determined to "satisfy" the second measurement threshold if the sets of measurements indicate a quality/strength of the first SLSS is greater than or equal to the second measurement threshold (e.g., second measurement threshold satisfied if $RSSI_{TRP1,TRP2} \geq UpperThresh_{RSSI}$, $RSRP_{TRP1,TRP2} \geq UpperThresh_{RSRP}$, $RSRQ_{TRP1,TRP2} \geq UpperThresh_{RSRQ}$). In this regard, the first UE 115-g may activate the one or more timers if a strength/quality associated with the first SLSSs drops below a predetermined level/threshold, and may deactivate the one or more timers if the strength/quality associate with the first SLSSs rises above a second predetermined level/threshold.

For example, in cases where the first UE 115-g initiates a single timer based on the first and/or second set of measurements satisfying the first measurement threshold, the first UE 115-g may deactivate the single timer if the first set of measurements, the second set of measurements, or both, are subsequently determined to satisfy the second measurement threshold. By way of another example, in cases where the first UE 115-g operates (e.g., initiates, deactivates) separate timers associated with the respective TRPs, the first UE 115-g may deactivate the timer associated with a respective TRP if the set of measurements associated with the respective TRP are subsequently found to satisfy the second measured threshold. For example, the first UE 115-g may initiate the second timer associated with the second TRP if the second set of measurements associated with the second TRP satisfy the first measurement threshold (e.g., initiate second timer if $RSRP_{TRP2} \leq LowerThresh_{RSRP}$). Subsequently, the first UE 115-g may deactivate the second timer if the second set of measurements associated with the second TRP are found to satisfy the second measurement threshold (e.g., deactivate second timer if $RSRP_{TRP2} \geq UpperThresh_{RSRP}$).

In some aspects, the first UE 115-g may determine whether or not to deactivate the timers at regular or irregular intervals throughout the expiration time of the timers. In cases where the first UE 115-g determines that the one or more timers are deactivated (e.g., second measurement threshold satisfied before the timers expire), the process flow 400 may proceed to 465. At 465, the first UE 115-g may refrain from transmitting the second SLSS based on the deactivation of the one or more timers, as discussed previously herein. Conversely, if the first UE 115-g determines that the timers have not expired, process flow 400 may proceed to 455.

At 455, the first UE 115-g may determine an expiration of the one or more timers. In some aspects, the first UE 115-g may determine an expiration of the timers based on a duration of each of the respective timers, a time that each timer was initiated, or both. For example, the UE 115-g may determine an expiration of a timer if the first UE 115-g determines that the second measurement threshold has not been satisfied within the expiration time of the timer. As noted previously herein, the first UE 115-g may determine an expiration of a single timer associated with both TRPs, may independently determine an expiration of separate timers associated with the respective TRPs, or both.

Upon determining the expiration of the timers, the process flow 400 may proceed to 460. At 460, the first UE 115-g may transmit the second SLSS based on the expiration of the one or more timers. In some aspects, the first UE 115-g may transmit the second SLSS only with the TRP associated with the expired timer, with both TRPs, or both. For example, if the first UE 115-g determines an expiration of the second timer associated with the second TRP, the first UE 115-g may transmit the second SLSS at 460 using only the second TRP. By way of example, if the first UE 115-g determines an expiration of the second timer associated with the second TRP, the first UE 115-g may transmit the second SLSS at 460 using both the second TRP and the first TRP.

Techniques described herein may enable the first UE 115-g (e.g., multi-TRP UE 115-g) to effectively determine whether the first UE 115 should relay SLSSs to other UEs 115 within the wireless communications system. In particular, by comparing measurements performed at the multiple TRPs to one or more measurement thresholds, the first UE 115-g may be able to efficiently determine whether the first UE 115-g should become a SyncRef UE 115 to improve distribution of SLSSs throughout the system. Accordingly, by improving the efficiency and reliability of SLSS distribution, techniques described wherein may improve clock synchronization among UEs 115 within a wireless communications system (e.g., wireless communications system 100, 200, or 300), thereby leading to improved wireless communications and improved user experience.

Figure 5:
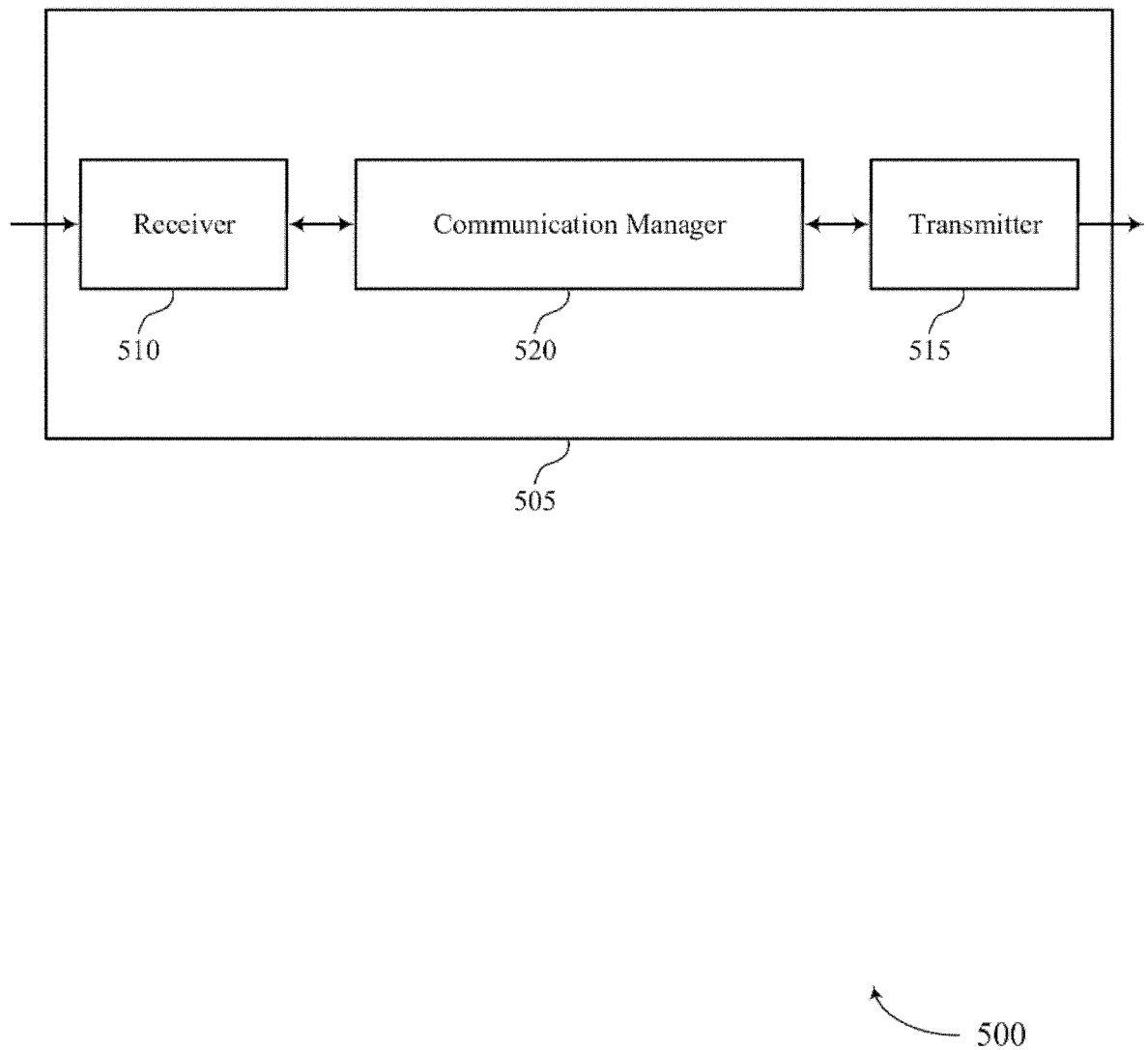
FIGS. 5 and 6 show block diagrams of devices that support techniques for SLSS transmission with multi-TRP UEs in accordance with aspects of the present disclosure.

FIG. 5 shows a block diagram 500 of a device 505 that supports techniques for SLSS transmission with multi-TRP UEs in accordance with aspects of the present disclosure. The device 505 may be an example of aspects of a UE 115 as described herein. The device 505 may include a receiver 510, a transmitter 515, and a communication manager 520. The device 505 may also include a processor. Each of these components may be in communication with one another (e.g., via one or more buses).

The receiver 510 may provide a means for receiving information such as packets, user data, or control information associated with various information channels (e.g., control channels, data channels, information related to techniques for SLSS transmission with multi-TRP UEs). Information may be passed on to other components of the device 505. The receiver 510 may utilize a single antenna or a plurality of antennas.

The transmitter 515 may provide a means for transmitting signals generated by other components of the device 505. In some examples, the transmitter 515 may be co-located with a receiver 510 in a transceiver module. The transmitter 515 may utilize a single antenna or a plurality of antennas.

The communication manager 520, the receiver 510, the transmitter 515, or various combinations thereof or various components thereof, may be an example of a means for performing various aspects of techniques for SLSS transmission with multi-TRP UEs as described herein.

In some examples, the communication manager 520 the receiver 510, the transmitter 515, or various combinations thereof or components thereof, may be implemented in hardware (e.g., in communications management circuitry). The circuitry may include a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described in the present disclosure.

Additionally or alternatively, in some examples, the communication manager 520, the receiver 510, the transmitter 515, or various combinations thereof or components thereof, may be implemented in code (e.g., as communications management software or firmware) executed by a processor. If implemented in code executed by a processor, the functions of the communication manager 520, the receiver 510, the transmitter 515, or various combinations thereof or components thereof, may be executed by a general-purpose processor, a DSP, a CPU, an ASIC, an FPGA, or some other programmable logic device.

In some examples, the communication manager 520 may be configured to perform various operations (e.g., receiving, monitoring, transmitting) using or otherwise in cooperation with the receiver 510, the transmitter 515, or both.

The communication manager 520 may support wireless communication at a first UE in accordance with examples as disclosed herein. For example, the communication manager 520 may be configured to provide or support a means for receiving, from a second UE, a first SLSS at a first TRP and a second TRP different from the first TRP. The communication manager 520 may be configured to provide or support a means for performing a first set of measurements on the first SLSS received at the first TRP and a second set of measurements on the first SLSS received at the second TRP. The communication manager 520 may be configured to provide or support a means for transmitting, to a third UE, a second SLSS based at least in part on the first set of measurements, the second set of measurements, or both, satisfying one or more measurement thresholds.

By including or configuring the communication manager 520 in accordance with examples as described herein, the device 505 may support improved techniques for improved SLSS transmission and reception in the context of multi-TRP UEs 115. For example, by improving the determination as to whether a multi-TRP UE 115 should relay received SLSSs, the distribution of SLSSs within a wireless communications system may be improved. Moreover, determining which TRP(s) should be used to relay SLSSs may further improve SLSS distribution. By improving SLSS distribution within a wireless communications system, internal clocks of UEs 115 within the wireless communications system 100 may be improved, thereby leading to more efficient and reliable wireless communications, reducing a quantity of retransmissions which may be required, and improving user experience.

Based on determining whether to relay SLSSs, a processor of the multi-TRP UE 115 (e.g., a processor controlling the receiver 510, the communication manager 520, the transmitter 515, etc.) may reduce processing resources used for wireless communications. For example, by improving distribution of SLSSs within a wireless communications system, clock synchronization among UEs 115 within the wireless communications system may be improved. The improved clock synchronization among UEs 115 may improve the efficiency and reliability of sidelink transmissions exchanged among the UEs 115 and with the base stations 105, thereby reducing a quantity of retransmissions which must be performed, and reducing network overhead. Moreover, by improving clock synchronization and reducing quantities of retransmissions, techniques described herein may reduce how often a processor of the multi-TRP UE 115 must ramp up to handle signal transmission and reception, thereby reducing processing resources, reducing power consumption, and improving battery performance.

Figure 6:
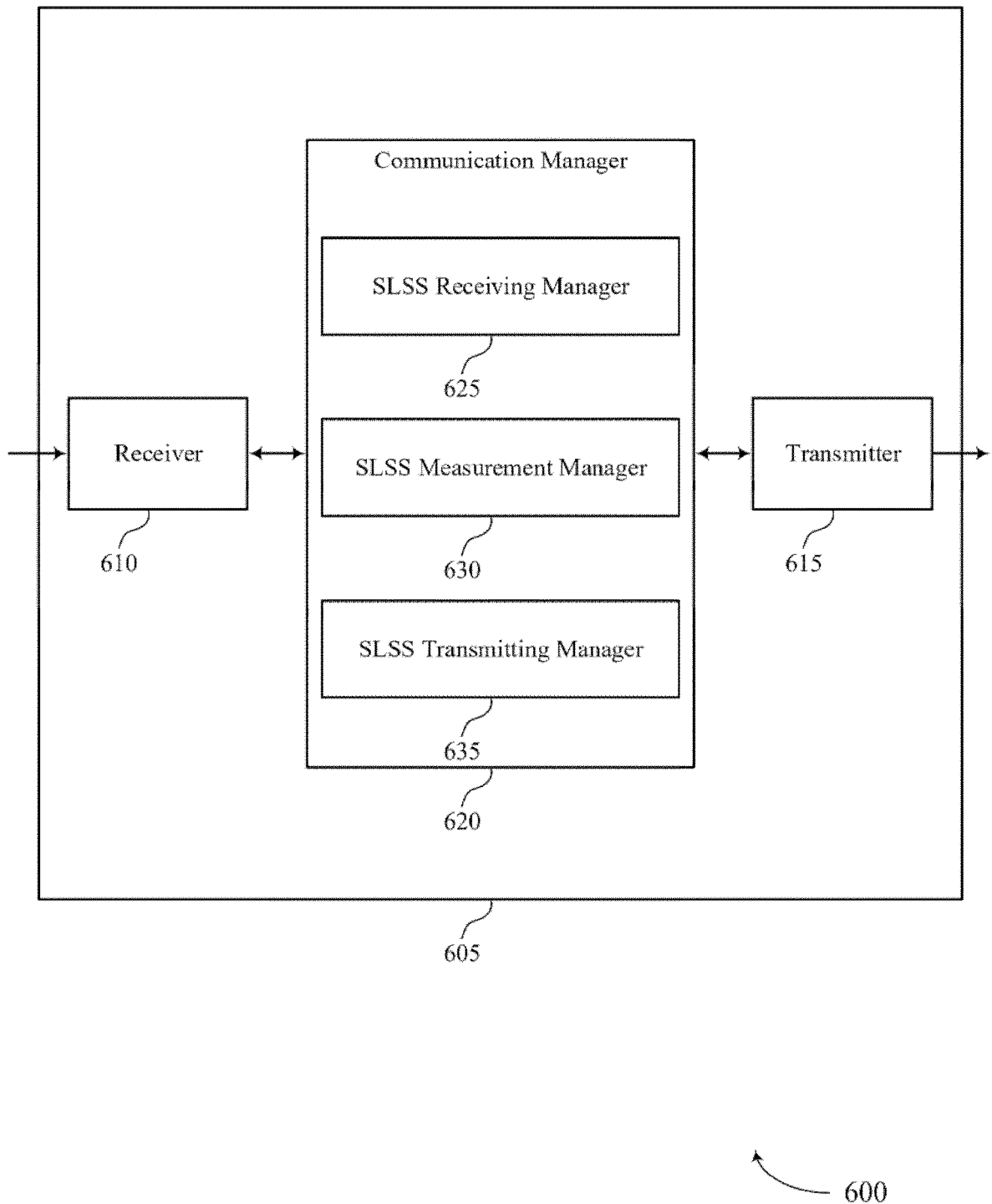

FIG. 6 shows a block diagram 600 of a device 605 that supports techniques for SLSS transmission with multi-TRP UEs in accordance with aspects of the present disclosure. The device 605 may be an example of aspects of a device 505 or a UE 115 as described herein. The device 605 may include a receiver 610, a transmitter 615, and a communication manager 620. The device 605 may also include a processor. Each of these components may be in communication with one another (e.g., via one or more buses).

The receiver 610 may provide a means for receiving information such as packets, user data, or control information associated with various information channels (e.g., control channels, data channels, information related to techniques for SLSS transmission with multi-TRP UEs). Information may be passed on to other components of the device 605. The receiver 610 may utilize a single antenna or a plurality of antennas.

The transmitter 615 may provide a means for transmitting signals generated by other components of the device 605. In some examples, the transmitter 615 may be co-located with a receiver 610 in a transceiver module. The transmitter 615 may utilize a single antenna or a plurality of antennas.

The device 605, or various components thereof, may be an example of means for performing various aspects of techniques for SLSS transmission with multi-TRP UEs as described herein. For example, the communication manager 620 may include an SLSS receiving manager 625, an SLSS measurement manager 630, an SLSS transmitting manager 635, or any combination thereof. The communication manager 620 may be an example of aspects of a communication manager 520 as described herein. In some examples, the communication manager 620, or various components thereof, may be configured to perform various operations (e.g., receiving, monitoring, transmitting) using or otherwise in cooperation with the receiver 610, the transmitter 615, or both.

The communication manager 620 may support wireless communication at a first UE in accordance with examples as disclosed herein. The SLSS receiving manager 625 may be configured to provide or support a means for receiving, from a second UE, a first SLSS at a first TRP and a second TRP different from the first TRP. The SLSS measurement manager 630 may be configured to provide or support a means for performing a first set of measurements on the first SLSS received at the first TRP and a second set of measurements on the first SLSS received at the second TRP. The SLSS transmitting manager 635 may be configured to provide or support a means for transmitting, to a third UE, a second SLSS based on the first set of measurements, the second set of measurements, or both, satisfying one or more measurement thresholds.

Figure 7:
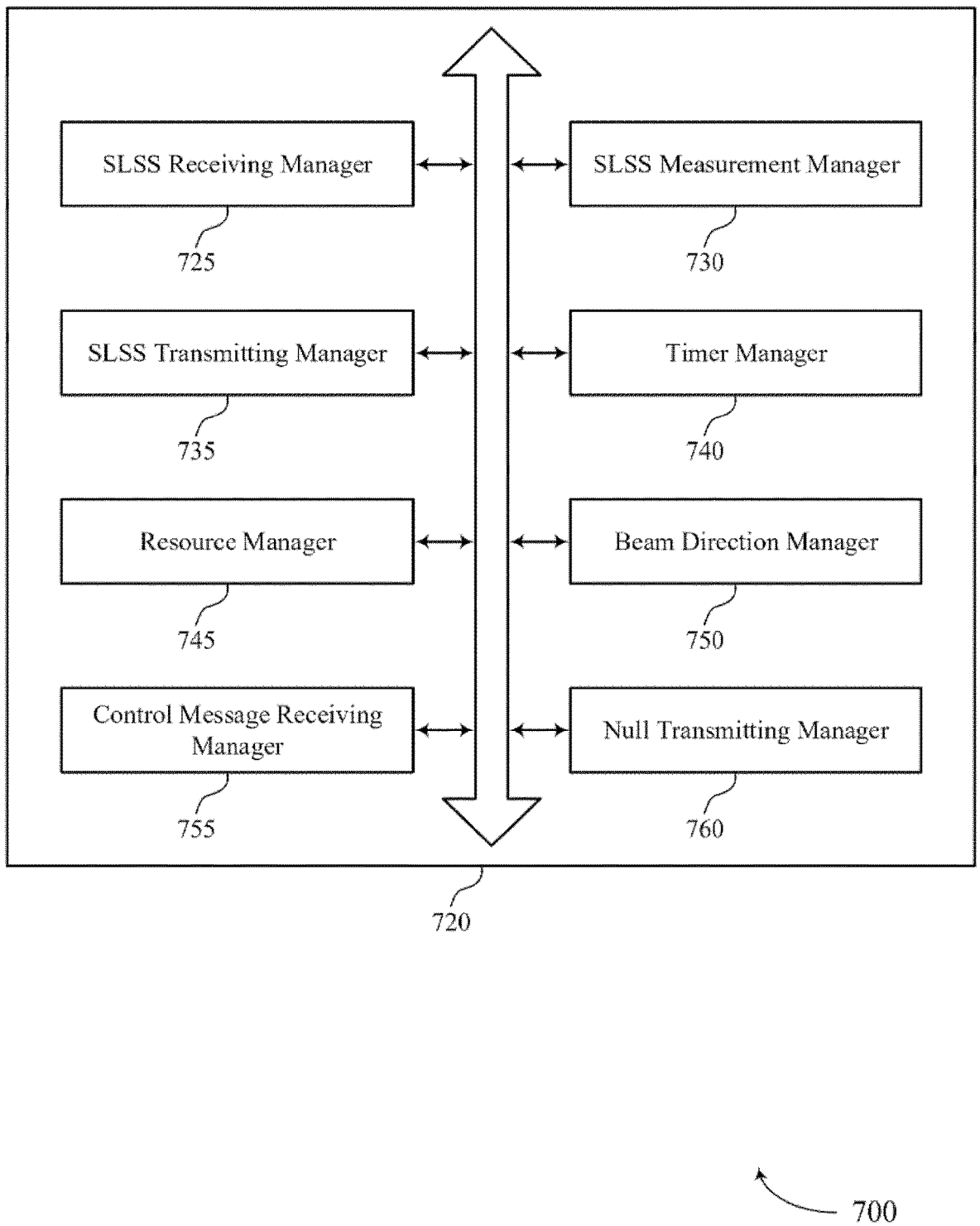
FIG. 7 shows a block diagram of a communication manager that supports techniques for SLSS transmission with multi-TRP UEs in accordance with aspects of the present disclosure.

FIG. 7 shows a block diagram 700 of a communication manager 720 that supports techniques for SLSS transmission with multi-TRP UEs in accordance with aspects of the present disclosure. The communication manager 720 may be an example of aspects of a communication manager 520, a communication manager 620, or both, as described herein. The communication manager 720, or various components thereof, may be an example of means for performing various aspects of techniques for SLSS transmission with multi-TRP UEs as described herein. For example, the communication manager 720 may include an SLSS receiving manager 725, an SLSS measurement manager 730, an SLSS transmitting manager 735, a timer manager 740, a resource manager 745, a beam direction manager 750, a control message receiving manager 755, a null transmitting manager 760, or any combination thereof. Each of these components may communicate, directly or indirectly, with one another (e.g., via one or more buses).

The communication manager 720 may support wireless communication at a first UE in accordance with examples as disclosed herein. The SLSS receiving manager 725 may be configured to provide or support a means for receiving, from a second UE, a first SLSS at a first TRP and a second TRP different from the first TRP. The SLSS measurement manager 730 may be configured to provide or support a means for performing a first set of measurements on the first SLSS received at the first TRP and a second set of measurements on the first SLSS received at the second TRP. The SLSS transmitting manager 735 may be configured to provide or support a means for transmitting, to a third UE, a second SLSS based on the first set of measurements, the second set of measurements, or both, satisfying one or more measurement thresholds.

In some examples, the SLSS measurement manager 730 may be configured to provide or support a means for determining that the first set of measurements fail to satisfy the one or more measurement thresholds. In some examples, the SLSS measurement manager 730 may be configured to provide or support a means for determining that the second set of measurements satisfy the one or more measurement thresholds. In some examples, the SLSS transmitting manager 735 may be configured to provide or support a means for transmitting the second SLSS using the second TRP based on determining that the first set of measurements fail to satisfy the one or more measurement thresholds, determining that the second set of measurements satisfy the one or more measurement thresholds, or both.

In some examples, the SLSS transmitting manager 735 may be configured to provide or support a means for refraining from transmitting the second SLSS using the first TRP based on determining that the first set of measurements fail to satisfy the one or more measurement thresholds.

In some examples, the SLSS transmitting manager 735 may be configured to provide or support a means for transmitting the second SLSS using the first TRP based on determining that the first set of measurements fail to satisfy the one or more measurement thresholds, determining that the second set of measurements satisfy the one or more measurement thresholds, or both.

In some examples, the first set of measurements, the second set of measurements, or both, including a received signal strength indicator measurement, a reference signal received power measurement, a reference signal received quality measurement, or any combination thereof.

In some examples, the one or more measurement thresholds including a received signal strength indicator threshold, a reference signal received power threshold, a reference signal received quality threshold, or any combination thereof. In some examples, the first set of measurements, the second set of measurements, or both, satisfying a respective measurement threshold if the first set of measurements, the second set of measurements, or both, are less than or equal to the respective measurement threshold.

In some examples, the SLSS measurement manager 730 may be configured to provide or support a means for determining that the first set of measurements, the second set of measurements, or both, satisfy a first measurement threshold of the one or more measurement thresholds. In some examples, the timer manager 740 may be configured to provide or support a means for initiating one or more timers based on determining that the first set of measurements, the second set of measurements, or both, satisfy the first measurement threshold. In some examples, the timer manager 740 may be configured to provide or support a means for determining an expiration of the one or more timers based on initiating the one or more timers, where transmitting the second SLSS is based on determining the expiration of the one or more timers.

In some examples, to initiate the one or more timers based on determining that the first set of measurements, the second set of measurements, or both, satisfy the first measurement threshold, the timer manager 740 may be configured to provide or support a means for initiating a first timer associated with the first TRP based on determining the first set of measurements satisfy the first measurement threshold. In some examples, to initiate the one or more timers based on determining that the first set of measurements, the second set of measurements, or both, satisfy the first measurement threshold, the timer manager 740 may be configured to provide or support a means for initiating a second timer associated with the second TRP based on determining the second set of measurements satisfy the first measurement threshold.

In some examples, to transmit the second SLSS, the SLSS transmitting manager 735 may be configured to provide or support a means for transmitting the second SLSS using the first TRP based on determining an expiration of the first timer associated with the first TRP. In some examples, to transmit the second SLSS, the SLSS transmitting manager 735 may be configured to provide or support a means for transmitting the second SLSS using the second TRP based on determining an expiration of the second timer associated with the second TRP.

In some examples, the SLSS measurement manager 730 may be configured to provide or support a means for determining that the first set of measurements, the second set of measurements, or both, satisfy a first measurement threshold of the one or more measurement thresholds. In some examples, the timer manager 740 may be configured to provide or support a means for initiating one or more timers based on determining that the first set of measurements, the second set of measurements, or both, satisfy the first measurement threshold. In some examples, the timer manager 740 may be configured to provide or support a means for deactivating the one or more timers based on determining that the first set of measurements, the second set of measurements, or both, satisfy a second measurement threshold of the one or more measurement thresholds, the second measurement threshold different from the first measurement threshold. In some examples, the SLSS transmitting manager 735 may be configured to provide or support a means for refraining from transmitting the second SLSS based on deactivating the one or more timers.

In some examples, the resource manager 745 may be configured to provide or support a means for determining a set of resources associated with the first SLSS, the second SLSS, or both, where transmitting the second SLSS is based on determining the set of resources.

In some examples, the SLSS receiving manager 725 may be configured to provide or support a means for receiving the first SLSS using a first subset of the set of resources based on determining the set of resources. In some examples, the SLSS transmitting manager 735 may be configured to provide or support a means for transmitting the second SLSS using a second subset of the set of resources different from the first subset based on determining the set of resources.

In some examples, the control message receiving manager 755 may be configured to provide or support a means for receiving, from a base station, a control message including an indication of the set of resources, where determining the set of resources is based on receiving the control message.

In some examples, to transmit the second SLSS, the SLSS transmitting manager 735 may be configured to provide or support a means for transmitting the second SLSS according to the set of resources using a selected TRP from the first TRP and the second TRP. In some examples, to transmit the second SLSS, the null transmitting manager 760 may be configured to provide or support a means for transmitting nulls according to the set of resources using the first TRP or the second TRP which is different from the selected TRP.

In some examples, the beam direction manager 750 may be configured to provide or support a means for estimating a beam direction of the first SLSS based on the first set of measurements and the second set of measurements, where the second SLSS is transmitted based on the estimated beam direction.

In some examples, the SLSS transmitting manager 735 may be configured to provide or support a means for transmitting the second SLSS along a second beam direction which is equivalent to the estimated beam direction.

Figure 8:
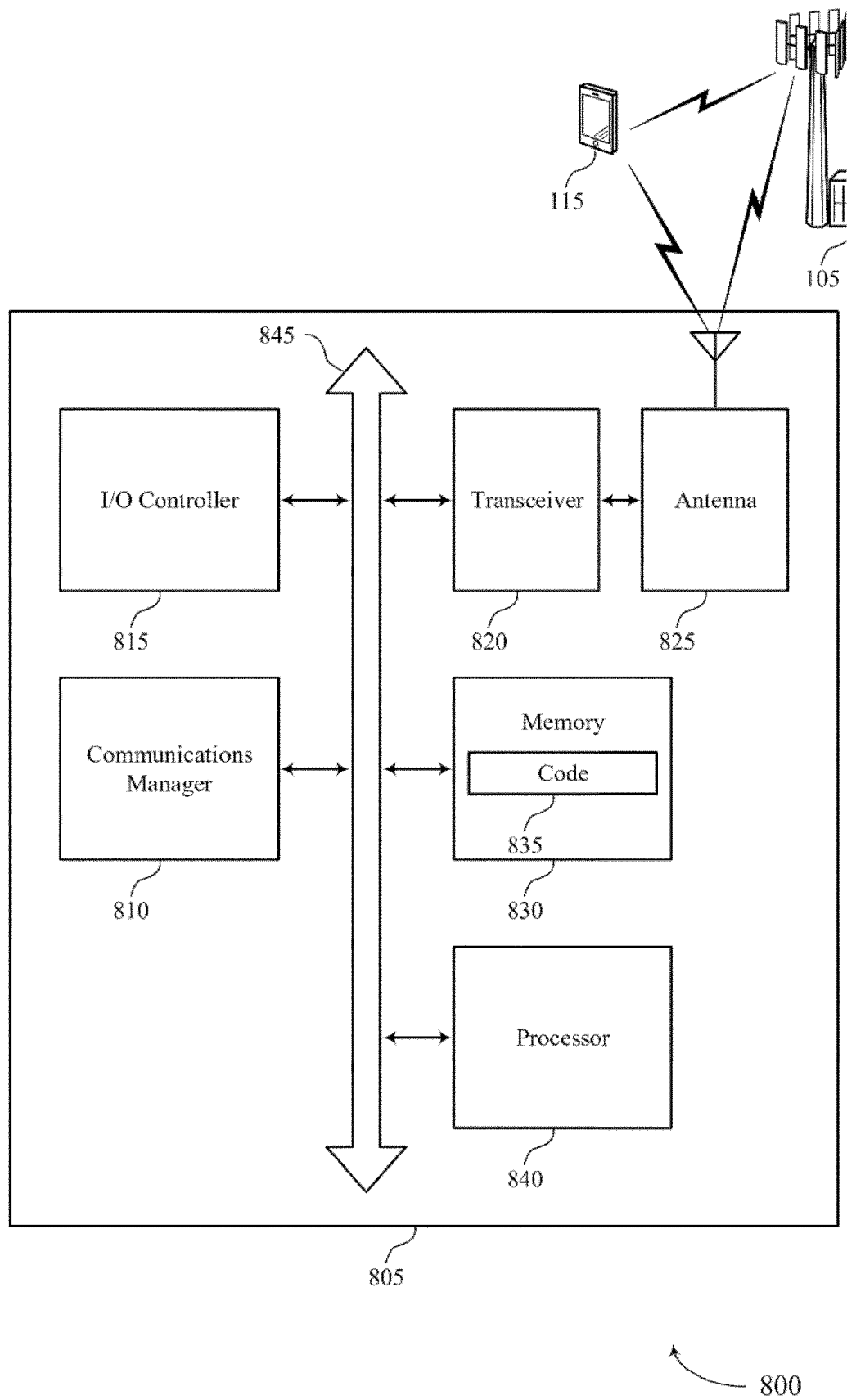
FIG. 8 shows a diagram of a system including a device that supports techniques for SLSS transmission with multi-TRP UEs in accordance with aspects of the present disclosure.

FIG. 8 shows a diagram of a system 800 including a device 805 that supports techniques for SLSS transmission with multi-TRP UEs in accordance with aspects of the present disclosure. The device 805 may be an example of or include the components of device, device 605, or a UE 115 as described herein. The device 805 may communicate wirelessly with one or more base stations 105, UEs 115, or any combination thereof. The device 805 may include components for bi-directional voice and data communications including components for transmitting and receiving communications, including a communication manager 810, a I/O controller 815, a transceiver 820, an antenna 825, a memory 830, a code 835, and a processor 840. These components may be in electronic communication or otherwise coupled (e.g., operatively, communicatively, functionally, electronically, electrically) via one or more buses (e.g., bus 845).

The I/O controller 815 may manage input and output signals for device 805. The I/O controller 815 may also manage peripherals not integrated into device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with device 805 via the I/O controller 815 or via hardware components controlled by the I/O controller 815.

In some cases, the device 805 may include a single antenna 825. However, in some cases the device may have more than one antenna 825, which may be capable of concurrently transmitting or receiving multiple wireless transmissions. The transceiver 820 may communicate bi-directionally, via the one or more antennas 825, wired, or wireless links as described herein. For example, the transceiver 820 may represent a wireless transceiver and may communicate bi-directionally with another wireless transceiver. The transceiver 820 may also include a modem to modulate the packets and provide the modulated packets to one or more antennas 825 for transmission, and to demodulate packets received from the one or more antennas 825. The transceiver 820, or the transceiver 820 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or other type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for SLSS transmission with multi-TRP UEs).

The communication manager 810 may support wireless communication at a first UE in accordance with examples as disclosed herein. For example, the communication manager 810 may be configured to provide or support a means for receiving, from a second UE, a first SLSS at a first TRP and a second TRP different from the first TRP. The communication manager 810 may be configured to provide or support a means for performing a first set of measurements on the first SLSS received at the first TRP and a second set of measurements on the first SLSS received at the second TRP. The communication manager 810 may be configured to provide or support a means for transmitting, to a third UE, a second SLSS based on the first set of measurements, the second set of measurements, or both, satisfying one or more measurement thresholds.

By including or configuring the communication manager 810 in accordance with examples as described herein, the device 805 may support improved techniques for improved SLSS transmission and reception, which may thereby improve battery performance and improve user experience. For example, by improving the determination as to whether a multi-TRP UE 115 should relay received SLSSs, the distribution of SLSSs within a wireless communications system may be improved. Moreover, determining which TRP(s) should be used to relay SLSSs may further improve SLSS distribution. By improving SLSS distribution within a wireless communications system, internal clocks of UEs 115 within the wireless communications system 100 may be improved, thereby leading to more efficient and reliable wireless communications, reducing a quantity of retransmissions which may be required, and improving user experience. In particular, by improving clock synchronization and reducing quantities of retransmissions, techniques described herein may reduce how often a processor of the multi-TRP UE 115 must ramp up to handle signal transmission and reception, thereby reducing processing resources, reducing power consumption, and improving battery performance.

In some examples, the communication manager 810 may be configured to perform various operations (e.g., receiving, monitoring, transmitting) using or otherwise in cooperation with the transceiver 820, the one or more antennas 825, or any combination thereof. Although the communication manager 810 is illustrated as a separate component, in some examples, one or more functions described with reference to the communication manager 810 may be supported by or performed by the processor 840, the memory 830, the code 835, or any combination thereof. For example, the code 835 may include instructions executable by the processor 840 to cause the device 805 to perform various aspects of techniques for SLSS transmission with multi-TRP UEs as described herein, or the processor 840 and the memory 830 may be otherwise configured to perform or support such operations.

Figure 9:
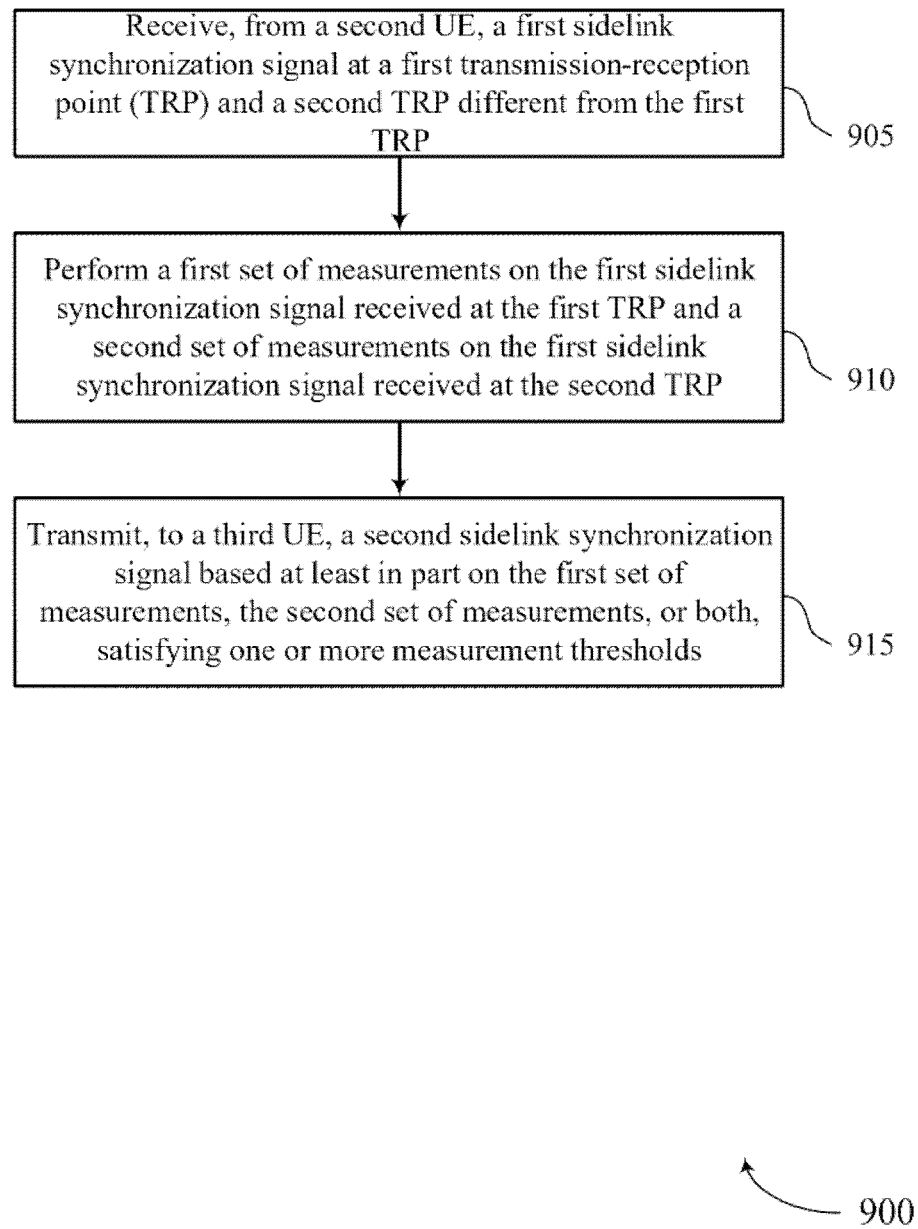
FIGS. 9 through 11 show flowcharts illustrating methods that support techniques for SLSS transmission with multi-TRP UEs in accordance with aspects of the present disclosure.

FIG. 9 shows a flowchart illustrating a method 900 for techniques for SLSS transmission with multi-TRP UEs in accordance with aspects of the present disclosure. The operations of method 900 may be implemented by a UE or its components as described herein. For example, the operations of method 900 may be performed by a UE 115 as described with reference to FIGS. 1 through 8. In some examples, a UE may execute a set of instructions to control the functional elements of the device to perform the described functions. Additionally or alternatively, the UE may perform aspects of the described functions using special-purpose hardware.

At 905, the method may include receiving, from a second UE, a first SLSS at a first TRP and a second TRP different from the first TRP. The operations of 905 may be performed according to the methods described herein. In some examples, aspects of the operations of 905 may be performed by an SLSS receiving manager 725 as described with reference to FIG. 7.

At 910, the method may include performing a first set of measurements on the first SLSS received at the first TRP and a second set of measurements on the first SLSS received at the second TRP. The operations of 910 may be performed according to the methods described herein. In some examples, aspects of the operations of 910 may be performed by an SLSS measurement manager 730 as described with reference to FIG. 7.

At 915, the method may include transmitting, to a third UE, a second SLSS based at least in part on the first set of measurements, the second set of measurements, or both, satisfying one or more measurement thresholds. The operations of 915 may be performed according to the methods described herein. In some examples, aspects of the operations of 915 may be performed by an SLSS transmitting manager 735 as described with reference to FIG. 7.

Figure 10:
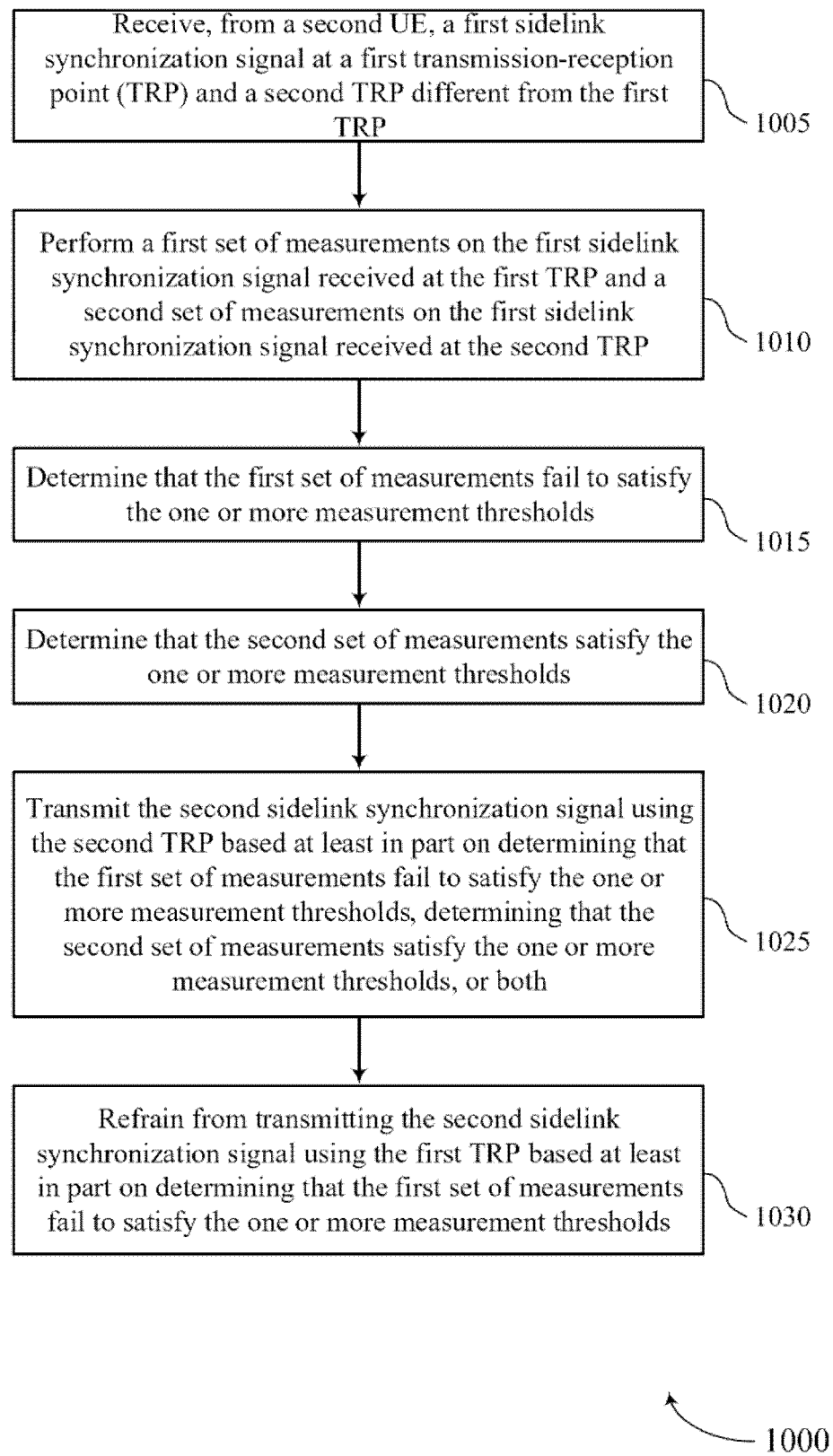

FIG. 10 shows a flowchart illustrating a method 1000 for techniques for SLSS transmission with multi-TRP UEs in accordance with aspects of the present disclosure. The operations of method 1000 may be implemented by a UE or its components as described herein. For example, the operations of method 1000 may be performed by a UE 115 as described with reference to FIGS. 1 through 8. In some examples, a UE may execute a set of instructions to control the functional elements of the device to perform the described functions. Additionally or alternatively, the UE may perform aspects of the described functions using special-purpose hardware.

At 1005, the method may include receiving, from a second UE, a first SLSS at a first TRP and a second TRP different from the first TRP. The operations of 1005 may be performed according to the methods described herein. In some examples, aspects of the operations of 1005 may be performed by an SLSS receiving manager 725 as described with reference to FIG. 7.

At 1010, the method may include performing a first set of measurements on the first SLSS received at the first TRP and a second set of measurements on the first SLSS received at the second TRP. The operations of 1010 may be performed according to the methods described herein. In some examples, aspects of the operations of 1010 may be performed by an SLSS measurement manager 730 as described with reference to FIG. 7.

At 1015, the method may include determining that the first set of measurements fail to satisfy the one or more measurement thresholds. The operations of 1015 may be performed according to the methods described herein. In some examples, aspects of the operations of 1015 may be performed by an SLSS measurement manager 730 as described with reference to FIG. 7.

At 1020, the method may include determining that the second set of measurements satisfy the one or more measurement thresholds. The operations of 1020 may be performed according to the methods described herein. In some examples, aspects of the operations of 1020 may be performed by an SLSS measurement manager 730 as described with reference to FIG. 7.

At 1025, the method may include transmitting the second SLSS using the second TRP based at least in part on determining that the first set of measurements fail to satisfy the one or more measurement thresholds, determining that the second set of measurements satisfy the one or more measurement thresholds, or both. The operations of 1025 may be performed according to the methods described herein. In some examples, aspects of the operations of 1025 may be performed by an SLSS transmitting manager 735 as described with reference to FIG. 7.

At 1030, the method may include refraining from transmitting the second SLSS using the first TRP based at least in part on determining that the first set of measurements fail to satisfy the one or more measurement thresholds. The operations of 1030 may be performed according to the methods described herein. In some examples, aspects of the operations of 1030 may be performed by an SLSS transmitting manager 735 as described with reference to FIG. 7.

Figure 11:
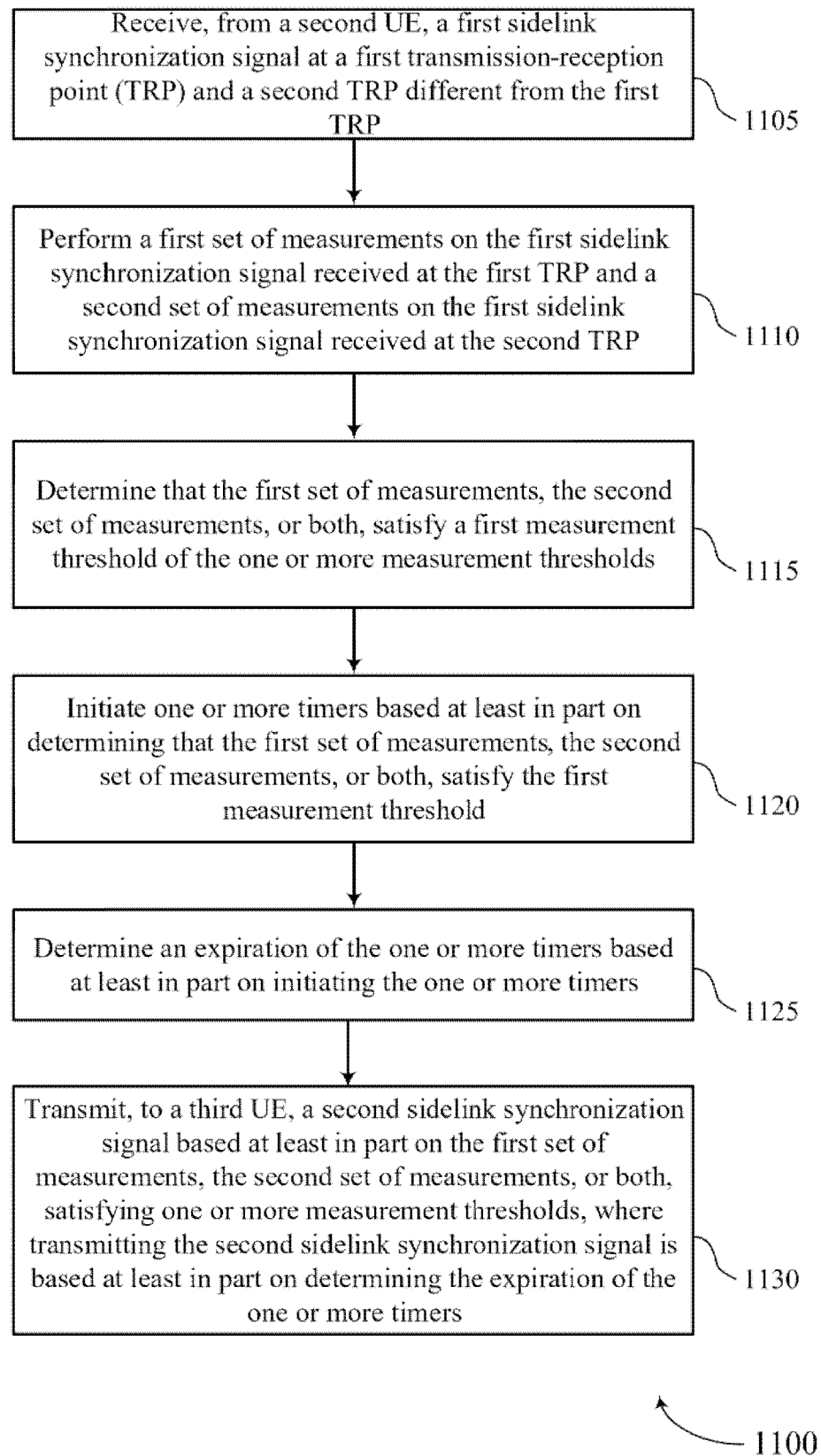

FIG. 11 shows a flowchart illustrating a method 1100 for techniques for SLSS transmission with multi-TRP UEs in accordance with aspects of the present disclosure. The operations of method 1100 may be implemented by a UE or its components as described herein. For example, the operations of method 1100 may be performed by a UE 115 as described with reference to FIGS. 1 through 8. In some examples, a UE may execute a set of instructions to control the functional elements of the device to perform the described functions. Additionally or alternatively, the UE may perform aspects of the described functions using special-purpose hardware.

At 1105, the method may include receiving, from a second UE, a first SLSS at a first TRP and a second TRP different from the first TRP. The operations of 1105 may be performed according to the methods described herein. In some examples, aspects of the operations of 1105 may be performed by an SLSS receiving manager 725 as described with reference to FIG. 7.

At 1110, the method may include performing a first set of measurements on the first SLSS received at the first TRP and a second set of measurements on the first SLSS received at the second TRP. The operations of 1110 may be performed according to the methods described herein. In some examples, aspects of the operations of 1110 may be performed by an SLSS measurement manager 730 as described with reference to FIG. 7.

At 1115, the method may include determining that the first set of measurements, the second set of measurements, or both, satisfy a first measurement threshold of the one or more measurement thresholds. The operations of 1115 may be performed according to the methods described herein. In some examples, aspects of the operations of 1115 may be performed by an SLSS measurement manager 730 as described with reference to FIG. 7.

At 1120, the method may include initiating one or more timers based at least in part on determining that the first set of measurements, the second set of measurements, or both, satisfy the first measurement threshold. The operations of 1120 may be performed according to the methods described herein. In some examples, aspects of the operations of 1120 may be performed by a timer manager 740 as described with reference to FIG. 7.

At 1125, the method may include determining an expiration of the one or more timers based at least in part on initiating the one or more timers. The operations of 1125 may be performed according to the methods described herein. In some examples, aspects of the operations of 1125 may be performed by a timer manager 740 as described with reference to FIG. 7.

At 1130, the method may include transmitting, to a third UE, a second SLSS based at least in part on the first set of measurements, the second set of measurements, or both, satisfying one or more measurement thresholds, where transmitting the second SLSS is based at least in part on determining the expiration of the one or more timers. The operations of 1130 may be performed according to the methods described herein. In some examples, aspects of the operations of 1130 may be performed by an SLSS transmitting manager 735 as described with reference to FIG. 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   receiving, from a second UE, a first sidelink synchronization signal at a first transmission-reception point (TRP) and a second TRP different from the first TRP;
   performing a first set of measurements on the first sidelink synchronization signal received at the first TRP and a second set of measurements on the first sidelink synchronization signal received at the second TRP;
   initiating one or more timers based at least in part on determining that the first set of measurements, the second set of measurements, or both, satisfy one or more measurement thresholds; and
   transmitting, to a third UE, a second sidelink synchronization signal based at least in part on determining an expiration of the one or more timers and based at least in part on the first set of measurements, the second set of measurements, or both, satisfying the one or more measurement thresholds.

2. The method of claim 1, further comprising:
   determining that the first set of measurements fail to satisfy the one or more measurement thresholds;
   determining that the second set of measurements satisfy the one or more measurement thresholds; and
   transmitting the second sidelink synchronization signal using the second TRP based at least in part on determining that the first set of measurements fail to satisfy the one or more measurement thresholds, determining that the second set of measurements satisfy the one or more measurement thresholds, or both.

3. The method of claim 2, further comprising:
   refraining from transmitting the second sidelink synchronization signal using the first TRP based at least in part on determining that the first set of measurements fail to satisfy the one or more measurement thresholds.

4. The method of claim 2, further comprising:
   transmitting the second sidelink synchronization signal using the first TRP based at least in part on determining that the first set of measurements fail to satisfy the one or more measurement thresholds, determining that the second set of measurements satisfy the one or more measurement thresholds, or both.

5. The method of claim 1, wherein the first set of measurements, the second set of measurements, or both, comprise a received signal strength indicator measurement, a reference signal received power measurement, a reference signal received quality measurement, or any combination thereof.

6. The method of claim 5, wherein the one or more measurement thresholds comprise a received signal strength indicator threshold, a reference signal received power threshold, a reference signal received quality threshold, or any combination thereof,
the first set of measurements, the second set of measurements, or both, satisfy a respective measurement threshold if the first set of measurements, the second set of measurements, or both, are less than or equal to the respective measurement threshold.

7. The method of claim 1, further comprising:
determining that the first set of measurements, the second set of measurements, or both, satisfy a first measurement threshold of the one or more measurement thresholds, wherein initiating the one or more timers based at least in part on determining that the first set of measurements, the second set of measurements, or both, satisfy one or more measurement thresholds comprises:
initiating the one or more timers based at least in part on determining that the first set of measurements, the second set of measurements, or both, satisfy the first measurement threshold; and
determining the expiration of the one or more timers based at least in part on initiating the one or more timers.

8. The method of claim 7, wherein initiating the one or more timers based at least in part on determining that the first set of measurements, the second set of measurements, or both, satisfy the first measurement threshold, comprises:
initiating a first timer associated with the first TRP based at least in part on determining the first set of measurements satisfy the first measurement threshold; and
initiating a second timer associated with the second TRP based at least in part on determining the second set of measurements satisfy the first measurement threshold.

9. The method of claim 8, wherein transmitting the second sidelink synchronization signal comprises:
transmitting the second sidelink synchronization signal using the first TRP based at least in part on determining an expiration of the first timer associated with the first TRP; and
transmitting the second sidelink synchronization signal using the second TRP based at least in part on determining an expiration of the second timer associated with the second TRP.

10. The method of claim 1, further comprising:
determining that the first set of measurements, the second set of measurements, or both, satisfy a first measurement threshold of the one or more measurement thresholds, wherein initiating the one or more timers based at least in part on determining that the first set of measurements, the second set of measurements, or both, satisfy one or more measurement thresholds comprises:
initiating the one or more timers based at least in part on determining that the first set of measurements, the second set of measurements, or both, satisfy the first measurement threshold;
deactivating the one or more timers based at least in part on determining that the first set of measurements, the second set of measurements, or both, satisfy a second measurement threshold of the one or more measurement thresholds, the second measurement threshold different from the first measurement threshold; and
refraining from transmitting the second sidelink synchronization signal based at least in part on deactivating the one or more timers.

11. The method of claim 1, further comprising:
determining a set of resources associated with the first sidelink synchronization signal, the second sidelink synchronization signal, or both, wherein transmitting the second sidelink synchronization signal is based at least in part on determining the set of resources.

12. The method of claim 11, further comprising:
receiving the first sidelink synchronization signal using a first subset of the set of resources based at least in part on determining the set of resources; and
transmitting the second sidelink synchronization signal using a second subset of the set of resources different from the first subset based at least in part on determining the set of resources.

13. The method of claim 11, further comprising:
receiving, from a base station, a control message comprising an indication of the set of resources, wherein determining the set of resources is based at least in part on receiving the control message.

14. The method of claim 11, wherein transmitting the second sidelink synchronization signal comprises:
transmitting the second sidelink synchronization signal according to the set of resources using a selected TRP from the first TRP and the second TRP; and
transmitting nulls according to the set of resources using the first TRP or the second TRP which is different from the selected TRP.

15. The method of claim 1, further comprising:
estimating a beam direction of the first sidelink synchronization signal based at least in part on the first set of measurements and the second set of measurements, wherein the second sidelink synchronization signal is transmitted based at least in part on the estimated beam direction.

16. The method of claim 15, further comprising:
transmitting the second sidelink synchronization signal along a second beam direction which is equivalent to the estimated beam direction.

17. An apparatus for wireless communication at a first user equipment (UE), comprising:
a processor;
memory coupled with the processor; and
instructions stored in the memory and executable by the processor to cause the apparatus to:
receive, from a second UE, a first sidelink synchronization signal at a first transmission-reception point (TRP) and a second TRP different from the first TRP;
perform a first set of measurements on the first sidelink synchronization signal received at the first TRP and a second set of measurements on the first sidelink synchronization signal received at the second TRP;
initiate one or more timers based at least in part on determining that the first set of measurements, the second set of measurements, or both, satisfy one or more measurement thresholds; and
transmit, to a third UE, a second sidelink synchronization signal based at least in part on determining an expiration of the one or more timers and based at least in part on the first set of measurements, the second set of measurements, or both, satisfying the one or more measurement thresholds.

18. The apparatus of claim 17, wherein the instructions are further executable by the processor to cause the apparatus to:
determine that the first set of measurements fail to satisfy the one or more measurement thresholds;
determine that the second set of measurements satisfy the one or more measurement thresholds; and
transmit the second sidelink synchronization signal using the second TRP based at least in part on determining that the first set of measurements fail to satisfy the one or more measurement thresholds, determining that the second set of measurements satisfy the one or more measurement thresholds, or both.

19. The apparatus of claim 18, wherein the instructions are further executable by the processor to cause the apparatus to:
refrain from transmitting the second sidelink synchronization signal using the first TRP based at least in part on determining that the first set of measurements fail to satisfy the one or more measurement thresholds.

20. The apparatus of claim 18, wherein the instructions are further executable by the processor to cause the apparatus to:
transmit the second sidelink synchronization signal using the first TRP based at least in part on determining that the first set of measurements fail to satisfy the one or more measurement thresholds, determining that the second set of measurements satisfy the one or more measurement thresholds, or both.

21. The apparatus of claim 17, wherein the first set of measurements, the second set of measurements, or both, comprise a received signal strength indicator measurement, a reference signal received power measurement, a reference signal received quality measurement, or any combination thereof.

22. The apparatus of claim 21, wherein the one or more measurement thresholds comprise a received signal strength indicator threshold, a reference signal received power threshold, a reference signal received quality threshold, or any combination thereof,
the first set of measurements, the second set of measurements, or both, satisfy a respective measurement threshold if the first set of measurements, the second set of measurements, or both, are less than or equal to the respective measurement threshold.

23. The apparatus of claim 17, wherein the instructions are further executable by the processor to cause the apparatus to:
determine that the first set of measurements, the second set of measurements, or both, satisfy a first measurement threshold of the one or more measurement thresholds, wherein to initiate the one or more timers based at least in part on determining that the first set of measurements, the second set of measurements, or both, satisfy one or more measurement thresholds, the instructions are further executable by the processor to cause the apparatus to:
initiate the one or more timers based at least in part on determining that the first set of measurements, the second set of measurements, or both, satisfy the first measurement threshold; and
determine the expiration of the one or more timers based at least in part on initiating the one or more timers.

24. The apparatus of claim 23, wherein the instructions to initiate the one or more timers based at least in part on determining that the first set of measurements, the second set of measurements, or both, satisfy the first measurement threshold, are executable by the processor to cause the apparatus to:
initiate a first timer associated with the first TRP based at least in part on determining the first set of measurements satisfy the first measurement threshold; and
initiate a second timer associated with the second TRP based at least in part on determining the second set of measurements satisfy the first measurement threshold.

25. The apparatus of claim 24, wherein the instructions to transmit the second sidelink synchronization signal are executable by the processor to cause the apparatus to:
transmit the second sidelink synchronization signal using the first TRP based at least in part on determining an expiration of the first timer associated with the first TRP; and
transmit the second sidelink synchronization signal using the second TRP based at least in part on determining an expiration of the second timer associated with the second TRP.

26. The apparatus of claim 17, wherein the instructions are further executable by the processor to cause the apparatus to:
determine that the first set of measurements, the second set of measurements, or both, satisfy a first measurement threshold of the one or more measurement thresholds, wherein to initiate the one or more timers based at least in part on determining that the first set of measurements, the second set of measurements, or both, satisfy one or more measurement thresholds, the instructions are further executable by the processor to cause the apparatus to:
initiate the one or more timers based at least in part on determining that the first set of measurements, the second set of measurements, or both, satisfy the first measurement threshold;
deactivate the one or more timers based at least in part on determining that the first set of measurements, the second set of measurements, or both, satisfy a second measurement threshold of the one or more measurement thresholds, the second measurement threshold different from the first measurement threshold; and
refrain from transmitting the second sidelink synchronization signal based at least in part on deactivating the one or more timers.

27. The apparatus of claim 17, wherein the instructions are further executable by the processor to cause the apparatus to:
determine a set of resources associated with the first sidelink synchronization signal, the second sidelink synchronization signal, or both, wherein transmitting the second sidelink synchronization signal is based at least in part on determining the set of resources.

28. The apparatus of claim 27, wherein the instructions are further executable by the processor to cause the apparatus to:
receive the first sidelink synchronization signal using a first subset of the set of resources based at least in part on determining the set of resources; and
transmit the second sidelink synchronization signal using a second subset of the set of resources different from the first subset based at least in part on determining the set of resources.

29. The apparatus of claim 27, wherein the instructions are further executable by the processor to cause the apparatus to:
receive, from a base station, a control message comprising an indication of the set of resources, wherein determining the set of resources is based at least in part on receiving the control message.

30. The apparatus of claim 27, wherein the instructions to transmit the second sidelink synchronization signal are executable by the processor to cause the apparatus to:
transmit the second sidelink synchronization signal according to the set of resources using a selected TRP from the first TRP and the second TRP; and
transmit nulls according to the set of resources using the first TRP or the second TRP which is different from the selected TRP.

31. The apparatus of claim 17, wherein the instructions are further executable by the processor to cause the apparatus to:
estimate a beam direction of the first sidelink synchronization signal based at least in part on the first set of measurements and the second set of measurements, wherein the second sidelink synchronization signal is transmitted based at least in part on the estimated beam direction.

32. The apparatus of claim 31, wherein the instructions are further executable by the processor to cause the apparatus to:
transmit the second sidelink synchronization signal along a second beam direction which is equivalent to the estimated beam direction.

33. An apparatus for wireless communication at a first user equipment (UE), comprising:
means for receiving, from a second UE, a first sidelink synchronization signal at a first transmission-reception point (TRP) and a second TRP different from the first TRP;
means for performing a first set of measurements on the first sidelink synchronization signal received at the first TRP and a second set of measurements on the first sidelink synchronization signal received at the second TRP;
means for initiating one or more timers based at least in part on determining that the first set of measurements, the second set of measurements, or both, satisfy one or more measurement thresholds; and
means for transmitting, to a third UE, a second sidelink synchronization signal based at least in part on determining an expiration of the one or more timers and based at least in part on the first set of measurements, the second set of measurements, or both, satisfying the one or more measurement thresholds.

34. A non-transitory computer-readable medium storing code for wireless communication at a first user equipment (UE), the code comprising instructions executable by a processor to:
receive, from a second UE, a first sidelink synchronization signal at a first transmission-reception point (TRP) and a second TRP different from the first TRP;
perform a first set of measurements on the first sidelink synchronization signal received at the first TRP and a second set of measurements on the first sidelink synchronization signal received at the second TRP;
initiate one or more timers based at least in part on determining that the first set of measurements, the second set of measurements, or both, satisfy one or more measurement thresholds; and
transmit, to a third UE, a second sidelink synchronization signal based at least in part on determining an expiration of the one or more timers and based at least in part on the first set of measurements, the second set of measurements, or both, satisfying the one or more measurement thresholds.

* * * * *